(12) United States Patent
Conger et al.

(10) Patent No.: US 7,931,816 B2
(45) Date of Patent: Apr. 26, 2011

(54) METHOD, APPARATUS AND SYSTEMS FOR TREATING CONTAMINANTS IN A WASTE FLUID

(75) Inventors: Harry C. Conger, Santa Fe, NM (US); James W. Muzzy, Lakewood, CO (US); Michael E. Mullins, Houghton, MI (US)

(73) Assignee: ACOS LLC, Lakewood, CO (US)

( * ) Notice: Subject to any disclaimer, the term of this patent is extended or adjusted under 35 U.S.C. 154(b) by 524 days.

(21) Appl. No.: 11/482,014

(22) Filed: Jul. 7, 2006

(65) Prior Publication Data

US 2006/0249464 A1 Nov. 9, 2006

Related U.S. Application Data

(63) Continuation-in-part of application No. 11/027,824, filed on Dec. 29, 2004, now abandoned.

(60) Provisional application No. 60/697,856, filed on Jul. 8, 2005.

(51) Int. Cl.
*C02F 1/78* (2006.01)

(52) U.S. Cl. ............... 210/759; 210/760; 261/DIG. 42; 261/DIG. 72

(58) Field of Classification Search .................. 210/743, 210/749, 758, 759, 760, 761, 192, 198.1, 210/200, 201, 205, 209, 218, 220, 252, 908, 210/909, 910; 261/21, DIG. 42, DIG. 72; 422/28, 30, 31, 33, 211, 212, 213, 216, 218, 422/220, 224
See application file for complete search history.

(56) References Cited

U.S. PATENT DOCUMENTS

| | | | |
|---|---|---|---|
| 3,732,163 | A | 5/1973 | Lapidot |
| 4,028,246 | A | 6/1977 | Lund et al. |
| 4,229,296 | A | 10/1980 | Wheaton et al. |
| 4,332,687 | A | 6/1982 | Daignault et al. |
| 4,572,821 | A | 2/1986 | Brodard et al. |
| 4,990,316 | A | 2/1991 | Duguet |
| 5,126,111 | A | 6/1992 | Al-Ekabi et al. |

(Continued)

FOREIGN PATENT DOCUMENTS

EP 378994 A * 7/1990

(Continued)

OTHER PUBLICATIONS

Machine translation of EP378994 to Schuster, 1990 (tranlation obtained from espacenet May 2009).*

(Continued)

*Primary Examiner* — Matthew O Savage
*Assistant Examiner* — Lucas Stelling
(74) *Attorney, Agent, or Firm* — Frederick F. Calvetti; Jason D. Voight

(57) ABSTRACT

The invention relates to a method, apparatus and system for the treatment of organic and inorganic waste in a waste fluid. The method involves a co-current plug flow of fluid in a reactor in which ozone mass transfer conforms to the effective life of the ozone used in the treatment. Hydroxide and hydrogen peroxide can be added to the waste fluid. The combined fluids to be treated travel the reactor through a series of surfaces in a packed reactor. The apparatus includes a diffuser for ozone which assists in the co-current plug flow of fluids. The diffuser can have a porosity of about 10 microns. The invention further envisions a compact system for efficient treatment of waste fluids.

24 Claims, 15 Drawing Sheets

U.S. PATENT DOCUMENTS

| | | | |
|---|---|---|---|
| 5,171,544 A * | 12/1992 | Lang | 261/DIG. 72 |
| 5,252,224 A | 10/1993 | Modell et al. | |
| 5,266,214 A | 11/1993 | Safarzedeh-Amiri | |
| 5,364,537 A | 11/1994 | Paillard | |
| 5,470,481 A | 11/1995 | Modell et al. | |
| 5,498,347 A | 3/1996 | Richard | |
| 5,620,606 A | 4/1997 | McBrayer, Jr. et al. | |
| 5,651,897 A | 7/1997 | Lehmann | |
| 5,663,475 A | 9/1997 | Elgal | |
| 5,711,887 A * | 1/1998 | Gastman et al. | 210/748 |
| 5,843,307 A * | 12/1998 | Faivre et al. | 210/192 |
| 5,851,407 A | 12/1998 | Bowman et al. | |
| 5,888,389 A | 3/1999 | Griffith et al. | |
| 6,054,057 A | 4/2000 | Hazlebeck et al. | |
| 6,251,290 B1 | 6/2001 | Conaway | |
| 6,258,281 B1 * | 7/2001 | Niedbalski et al. | 210/760 |
| 6,517,729 B2 | 2/2003 | Campo et al. | |
| 6,780,331 B2 | 8/2004 | Galatro et al. | |
| 2002/0071794 A1 | 6/2002 | Jensen | |
| 2003/0075513 A1 | 4/2003 | Miller | |
| 2005/0178733 A1 | 8/2005 | Conger et al. | |

FOREIGN PATENT DOCUMENTS

| | | |
|---|---|---|
| EP | 0495707 | 7/1992 |
| EP | 0625482 | 11/1994 |
| EP | 0927701 | 7/1999 |
| EP | 00103884 | 9/2000 |
| FR | 3563208 | 10/1985 |
| JP | 5834080 | 2/1983 |
| WO | WO 8806144 | 8/1988 |
| WO | WO 9412437 | 6/1994 |
| WO | WO 2007/008744 A2 | 1/2007 |

OTHER PUBLICATIONS

Karimi A. "Ozone/Hydorgen Peroxide Demonstration Project to Treat Groundwater Contamination by TCE and PCE in North Hollywood, California" Ozonews, International Ozone Association, pp. 6-7 (1991).

Martin et al. "Modelization of Industrial Ozonation Tanks: A Useful Tool for the Design of 2000S Ozone Reactor" Water Supply, pp. 57-74 (1995).

International Search Report issued in PCT/US2006/026654 dated Dec. 28, 2006.

International Search Report, PCT/US04/43974, Dec. 27, 2005.

Acero et al., "Oxidation of Acetamide Herbicides in Natural Waters by Ozone and by the Combination of Ozone/Hydrogen Peroxide: Kinetic Study and Process Modeling," Ind. Eng. Chem. Res., vol. 42, pp. 5762-5769, 2003.

Beltran et al., "A Kinetic Model for Advanced Oxidation Processes of Aromatic Hydrocarbons in Water; Application to Phenanthrene and Nitrobenzene," Ind. Eng. Chem. Res., vol. 38, pp. 4189-4199, 1999.

Beltran et al., "An Attempt to Model the Kinetics of the Ozonation of Simazine in Water," Ind. Eng. Chem. Res., vol. 41, pp. 1723-1732, 2002.

Beltran et al., "Nitroaromatic Hydrocarbon Ozonation in Water 2.Combined Ozonation with Hydrogen Peroxide or UV Radiation," Ind. Eng. Chem. Res., pp. 32-40, 1998.

Beltran et al., "Oxidation and Polynuclear Aromatic Hydrocarbons in Water 4.Ozone Combined with Hydrogen Peroxide," Ind. Eng. Chem. Res., vol. 35, pp. 891-898, 1996.

Kuo et al., "Ozonation and Peroxone Oxidation of Toluene in Aqueous Solutions," Ind. Eng. Chem. Res., vol. 35, pp. 3973-3983, 1996.

Lang et al., "Treatability of MTBE-contaminated groundwater by Ozone and Peroxone," Journal AWWA, pp. 110-120, Jun. 2001.

Mullins, M.E., "Aqueous Phase Oxidation of Contaminants", Presented at AIChE Summer Convention, Philadelphia, PA. Aug. 1989.

Uknown, "Determination if the Design Size for the Cornay/Matzen Supercritical Water Oxidation System," CH2M Hill, (8 pages + attachments), Aug. 14, 2000.

G-Force Corp. brochure, 14 pages.

The Metropolitan Water District of So. Ca. et al., "Pilot-Scale Evaluation of Ozone and Peroxone," AWWA Research Foundation, 1991, pp. 1-321.

Janet Metsa et al., Comparative Study of the Advanced Chemical Oxidation System—ACOS Treatment Process, ERTH Technologies, Inc., Dec. 2008 (unpublished paper, on file with sponsoring org.).

Akita et al., Gas Holdup and Volumetric Mass Transfer Coefficient in Bubble Columns, Ind. Eng. Chem. Process Des. Develop., 1973; 12(1): 76-80.

* cited by examiner

ENTRY DEVICE/SYSTEM TO CREATE
SEGREGATED FLOW (PLUG FLOW) OF
WASTE FLUID AND OZONE INTO BOTTOM
OF REACTOR

METHOD, APPARATUS AND SYSTEMS FOR TREATING CONTAMINANTS IN A WASTE FLUID

CROSS-REFERENCE TO RELATED APPLICATIONS

This application is a continuation-in-part of U.S. application Ser. No. 11/027,824, filed Dec. 29, 2004 now abandoned, and claims the benefit of the effective filing date of U.S. provisional patent 60/697,856, filed Jul. 8, 2005, the entire contents of which are hereby incorporated by reference.

BACKGROUND OF THE INVENTION a. Field of the Invention

The invention relates to processes, devices and systems for the highly effective and efficient treatment of waste fluids, and in particular for the highly effective and efficient oxidation of contaminates in waste fluid. Oxidation reactions are carried out in multi-stage, co-current, plug flow reactors.

b. Background Art

Organic and non-organic industrial, agricultural and municipal waste materials are a prevalent and growing problem throughout the industrialized world. For example, industrial chemicals, pesticides, personal-care products and pharmaceuticals have been found in wastewater streams throughout the United States. Oil, mining and chemical refining facilities are key targets. These organic waste materials present environmental hazards, especially when the waste levels exceed EPA standards.

Treating waste materials in a wastewater or waste fluid is an area of active study. A number of techniques have been developed for the destruction of organic materials in a waste fluid, several of which are discussed in greater detail below. Although several of these techniques have been useful in the partial destruction of lower organic concentrations, few if any have proven effective or efficient at treating sources with higher concentrations of organic waste, for example waste fluids having more than 100 mg/l organic contaminates.

U.S. Pat. No. 6,093,328 discloses the use of hydrogen peroxide and solid particles formed between elemental iron and sulfur to remove arsenic and total organic carbon from water. The reaction is carried out at or below about 100° C.

U.S. Pat. No. 5,928,522 discloses a process for treating oil refining waste where large particles and waxy materials are removed and the remaining liquid is drawn off and centrifuged. The residual cake is treated with hydrogen peroxide and water to form a slurry which is heated to 100° F.

U.S. Pat. No. 6,251,290 discloses the use of hydrogen peroxide in a limited Fenton reaction to treat hydrocarbon ore at 60° C. to 100° C. This results in the partial oxidation of the hydrocarbons.

Hydrogen peroxide has further been used in a number of applications to treat fluids containing various waste materials. For example, in U.S. Pat. No. 6,051,145, and related U.S. Pat. No. 5,888,389, a multi-stage treatment of sewage sludge is disclosed using a first stage sub-critical pressure of between about 3,600 psi to 4,500 psi. The second stage is run at a higher temperature to produce super critical oxidation conditions.

U.S. Pat. No. 5,240,619 discloses a process characteristic of a super-critical oxidation. This process utilizes oxygen containing gas and pressures well in excess of the super critical pressure, e.g., 350 atm. The super critical pressure is applied in a first stage reaction at a temperature between 250° C. and 374° C. The second stage reaction is carried out at the same pressure and temperature between 374° C. and 600° C. This results in super critical oxidation conditions in the second stage reaction.

U.S. Pat. No. 6,080,309 discloses a process for the separation of impurities from liquids. In this process, a centrifuge is used to achieve temperatures and pressures which are no lower than 705.4° C. and 3,208 pounds per square inch. Such conditions exceed the super critical pressure and temperature of water. After reaching super critical conditions, oxygen in any form is introduced into the suspension. An oxidizing reagent such as hydrogen peroxide may be used.

The chemistry of advanced oxidation reactions can be quite complex.

U.S. Pat. No. 3,782,163 relates to a process for the ozone treatment of liquid material. The process includes introducing a major part of the liquid into a first ozonation zone and introducing the remainder into a second ozonation zone. The oxidation apparatus comprises two packed columns. The packing material can be raschig rings. The waste flow within the reactor is countercurrent with the flow of ozone within the reactor. The pH of the waste streams is at least about 12. The two reactors are necessary to complete the oxidation reaction.

U.S. Pat. No. 4,028,246 is directed to a liquid purification system. The system includes an airtight casing having a plurality of panels dividing the interior on the casing into a plurality of sections to form an ozone liquid contact chamber. The liquid runs down the panels and casing walls in a falling thin film. Ozone is introduced in the casing under pressure between 2 and 10 psi. The ozone flow contacts the liquid running over the panels. The flow of ozone and liquid is moving from the top of the casing to the bottom. No packing material is disclosed.

U.S. Pat. No. 4,229,296 describes a wet oxidation system employing a gas separation reactor. A waste water flow is directed to a bottom region of a first vertically elongated reaction zone at a first flow rate. An oxygen containing gas is charged to a bottom region of the reaction zone at a second flow rate. A lower liquid phase is separated from an upper gas phase. An aqueous liquid effluent is removed from the middle region of a plug flow type reaction zone wherein mixing in a traverse reaction zone occurs but which allows for no diffusion in the flow direction. The flow rates of the waste water in the oxygen containing gas are not the same. Composition of the reactant mixture varies along the flow path. The reactor is directed to operate at temperatures ranging from about 350° to 600° F. at pressures ranging from about 800 to 2200 psig. Waste water contains from about 0.8 to 3 weight percent of organic matter on a 100 weight percent basis. The reactor does not have a diffuser plate or a series of surfaces packed inside the reactor.

U.S. Pat. No. 5,364,537 discloses injection of hydrogen peroxide and ozone in flow direction co-current with circulation of water to be treated. The patent does not disclose a packed reactor or plug flow.

U.S. Pat. No. 5,851,407 claims a water decontamination process. The process comprises injection pressurized flow of hydrogen peroxide and ozone in a flow of contaminated water. The ozone and hydrogen peroxide are injected at velocities and directions matching those of contaminated water flow. The system for decontaminating water includes a high intensity mixer. The patent does not disclose a packed reactor.

U.S. Pat. No. 6,024,882 is a continuation-in-part application of U.S. Pat. No. 5,851,407. The '882 patent discloses a process and apparatus for exposing water to oxidizing conditions under pressure. A combination of ozone and single dose of hydrogen peroxide is added to the water but, under pressure, at an acidic pH and with high intensity mixing. The disclosure is focused on the control of bromate contamination in the water.

U.S. Pat. No. 6,054,057 is directed to a method for processing a feed material. The feed material can include an oxidant such as hydrogen peroxide, oxygen and air. The method includes initiating reaction by jet mixing the feed material in a back-mixing section of a reaction chamber, carrying out an additional reaction in the reaction stream in a plug flow section of the reaction chamber. Injection of feed material is through the top of the reaction chamber. The patent does not claim co-current flow of waste material.

U.S. Pat. No. 6,214,240 discloses that reaction in an ozone treatment using ozone mixed with hydrogen peroxide is very complex, because many reactions simultaneously take place and the reactions interfere with each other. The disclosure is directed to a computer simulation model and apparatus. It claims the use of a mixture of hydrogen peroxide and ozone for the ozone treatment of an effluent. Ozone concentrations are below 300 mg/l. The process is based on a volumetric mass transfer coefficient. The patent does not disclose the structure of the reactor or co-current flow of ozone and effluent. It does not teach a mass transfer of kinetics and oxidation rate in terms of time versus volume and time.

Ozone treatment of effluent using ozone mixed with hydrogen peroxide is a very complex reaction. A variety of apparatus and a variety of methods have been utilized as a result of the complexity of the reaction process. Applicants have advanced the treatment of such complex reaction systems by utilizing co-current flow of fluids in the substantial absence of back mixing during the effective life of ozone. Applicants now describe their invention in greater detail.

BRIEF SUMMARY OF THE INVENTION

This invention relates to a reactor for treating a waste fluid comprising reactor for treating waste fluid with hydrogen peroxide, hydroxide and ozone; the reactor having a series of surfaces constructed and arranged for plug flow of fluids under pressure; waste fluid inlet for receiving at least waste fluid beneath a plug flow regime in the reactor and reactant inlet for ozone located beneath the plug flow regime; diffuser device in juxtaposition to the reactant inlet effecting diffusion of ozone in the at least waste fluid; the porosity of the diffuser device and the series of surfaces effect an ozone mass transfer coefficient between about 0.05 to about 2 $\sec\hat{0}$-1; the waste fluid inlet and reactant inlet constructed and arranged for co-current plug flow of fluids; and outlet for treated fluid and off-gas, ozone, and volatile organic compounds positioned above the plug flow regime; wherein the ozone mass transfer characteristics of the reactor substantially conform to an effective life for the ozone.

This invention also relates to a method for treating waste fluid comprising reacting ozone, hydrogen peroxide and hydroxide co-currently with a flow of waste fluid without substantial back mixing thereof; and maintaining a pH between about 7 and about 11 for the fluid being treated and a pressure effective for an ozone mass transfer coefficient between about 0.05 and about 2 $\sec\hat{0}$-1 which complements an effective life of the ozone.

This invention further relates to a method for treating waste fluid comprising feeding under pressure a co-current segregated flow of ozone, hydrogen peroxide and hydroxide with waste fluid into a reactor; reacting a segregated flow of ozone, hydrogen peroxide, hydroxide and waste fluid for an effective life of the ozone; and recovering treated liquid and gas from a reactor.

This invention additionally relates to a method for treating waste fluid comprising feeding a co-current flow of waste fluid, ozone, hydrogen peroxide, and hydroxide without substantial back mixing into a reactor; the flow of fluid being under sufficient pressure, temperature and pH to effect an ozone mass transfer coefficient between about 0.05 and about 2 $\sec\hat{0}$-1 which complements an effective life of the ozone; and recovering oxidized liquid and gas.

This invention relates to a system for treating waste fluid comprising a hydrogen peroxide dispenser for storing and dispensing hydrogen peroxide continuously and a hydroxide dispenser for storing and dispensing hydroxide continuously both into a waste fluid; an ozone generator adapted to provide an effective amount of ozone into the waste fluid; at least one pressurized reactor having a series of surfaces and an ozone diffuser for treatment of the waste fluid, the series of surfaces and the porosity of the ozone diffuser effecting an ozone mass transfer coefficient between about 0.05 to about 2 $\sec\hat{0}$-1; wherein the reactor is constructed for co-current flow of the waste fluid, hydrogen peroxide, hydroxide, and ozone without substantial back mixing during an effective life of the ozone; and a flash chamber at the top of the reactor for receiving treated waste fluid and off-gas wherein off-gas, ozone, and volatile organic compounds are separated from treated waste fluid.

This invention relates to a reactor for treating a waste fluid comprising reactor for treating waste fluid with hydroxide and ozone; the reactor having a series of surfaces constructed and arranged for plug flow of fluids under pressure; waste fluid inlet for receiving at least waste fluid beneath a plug flow regime in the reactor and reactant inlet for ozone located beneath the plug flow regime; diffuser device in juxtaposition to the reactant inlet effecting diffusion of ozone in the at least waste fluid; the porosity of the diffuser device and the series of surfaces effect an ozone mass transfer coefficient between about 0.05 to about 2 $\sec\hat{0}$-1; the waste fluid inlet and reactant inlet constructed and arranged for co-current flow of fluids; outlet for treated fluid and off-gas, ozone, and volatile organic compounds positioned above the plug flow regime; and wherein the ozone mass transfer characteristics of the reactor substantially conform to an effective life for the ozone.

This invention also relates to a method for treating waste fluid comprising reacting ozone and hydroxide co-currently with a flow of waste fluid without substantial back mixing thereof; and maintaining a pH between about 7 and about 11 for the fluid being treated and a pressure effective for an ozone mass transfer coefficient between about 0.05 and about 2 $\sec\hat{0}$-1 which complements an effective life of the ozone.

These and various other features and advantages of the invention will be apparent from a reading of the following detailed description and review of the appended claims.

DETAILED DESCRIPTION OF THE INVENTION

Figure 1:
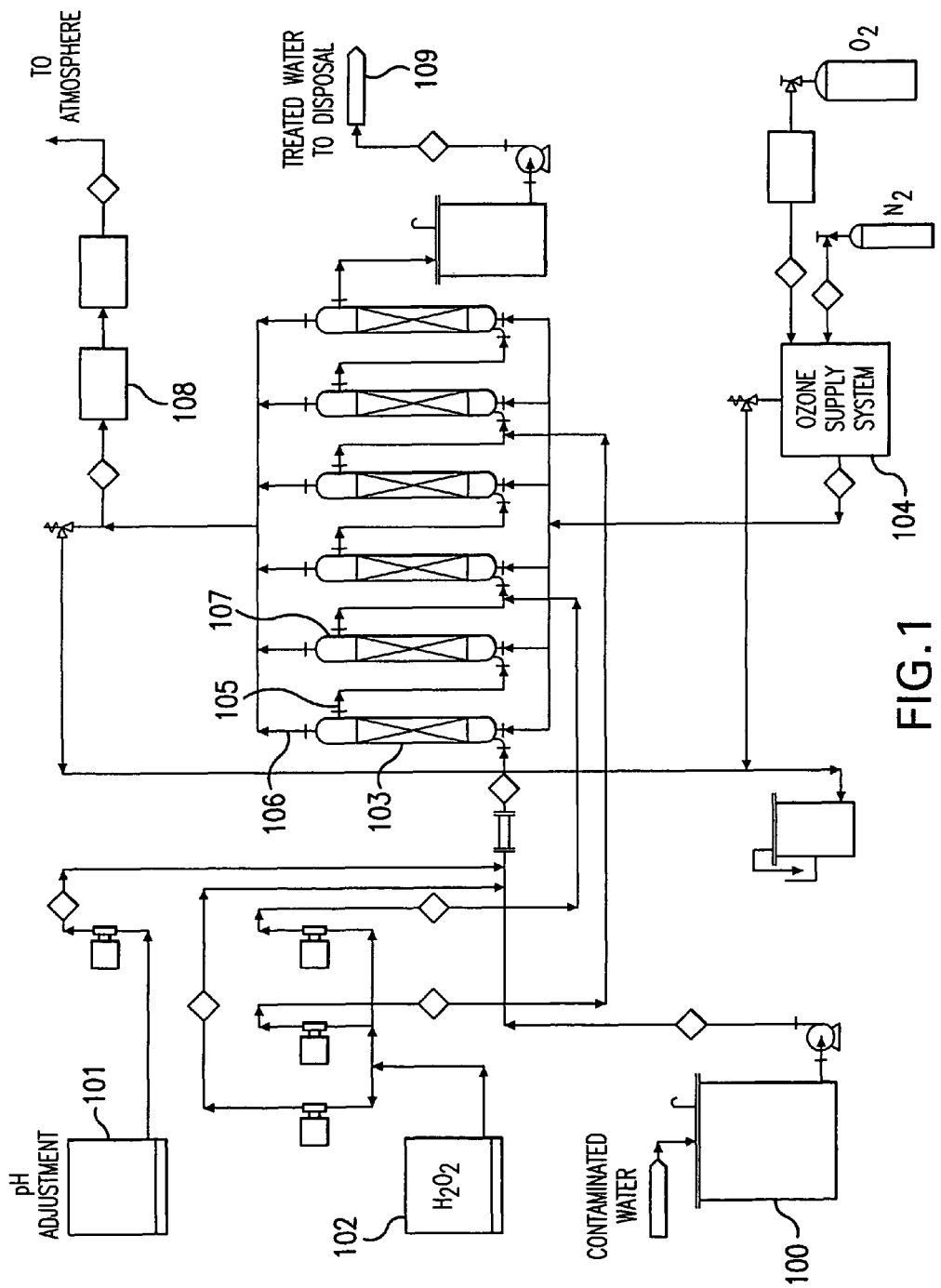
FIG. 1 is a flow diagram for a treatment process of a waste fluid in accordance with an embodiment of the present invention.

The present invention provides processes, reactors and systems for the treatment of contaminates in a waste fluid. The present invention provides enhanced treatment of contaminates over other conventional waste treatment techniques, especially where the destruction of high levels of contaminates in a waste fluid is required. The present invention provides enhanced oxidation reaction kinetics and mass flow transfer in order to have a waste fluid treatment environment for highly effective and efficient destruction of contaminates.

As used herein, waste fluids include, but are not limited to, the following sources: waste fluids from gas and oil related processing, including waste pits, drilling muds and refinery waste; waste from the chemical industry, including organic and petrochemical waste; waste from other industrial sources, such as waste metal, waste paint, waste solvents and waste pulp and paper; waste from mining operations; flue gas contaminates, for example from electrical power generation; waste from municipal sewage; waste from coal processing; waste from agricultural sources; and waste from dredging operations of harbors, channels and rivers. Several illustrative organic contaminates found within these waste fluids include: sulfides, disulfides, sulfites, mercaptans, mercaptans (thio), polysulfides, phenols, benzenes, substituted phenols, alcohols, glycols, aldehydes, ethylmercaptans, ethylene, oils, fats and grease.

Other industrial manufacturing processes require the use of ultra high purity water either as a direct process fluid or as a major component of a fluid product. The pharmaceutical electronic and electrical utilities industries are exemplary. Use of pure water in the pharmaceutical industry is apparent in view of the human use of products in that industry. The pharmaceutical industry requires use of water essentially free from insecticides, herbicides, chlorinated hydrocarbons, phenols, colorants, aroma substances and flavorings and other substances harmful or disagreeable to humans. Governments also frequently demand from such industrial sites that harmful organic components are removed from industrial effluents. Similarly, treatment of dermal disorder products and microbiocidal health and beauty care products require the use of water and products such as creams, gels, lotions, powders, tooth and other paste, suppositories, body and hair shampoos and rinses, oral hygiene rinses and other products for human use. The electronics industry requires pure water or fluid as a result of the continuously greater miniaturization in the manufacture of electronic devices on semi-conductor substrates such as crystal silicone wafers. Impurities cause defect in devices manufactured in that industry, and can effect long term reliability of the manufactured product. Impurities such as bacteria, bacterial fragments, inert debris and other microorganisms require treatment. The utility industry has needs as a result of degradation of high pressure steamed containment vessels and heat exchangers and a variety scaling and metallurgical problems associated with silicates and other metal corrosion problems.

Processes for the Destruction of Contaminates in a Waste Fluid

The processes of the present invention are based on the treatment of a waste fluid under conditions, and within an environment, that facilitates the destruction of contaminates. This enhanced destruction of contaminates in a waste fluid, in accordance with the present invention, occurs by a novel combination of increased mass transfer of the reactants in the waste fluid and by increased reaction rates of the reactants within the waste fluid. The combined factors of increased mass transfer and increased reaction rates allows for an extremely time efficient treatment process for the destruction of up to 99+% of contaminates, i.e. degredation of contaminates to below 1 mg/l, in a waste fluid.

Processes of the present invention involve partial to complete oxidation of contaminates in a waste fluid. Oxidants for use in the invention include ozone or ozone in combination with hydrogen peroxide. Ozone concentrations for use in the present invention are usually from about 4% to about 6% by weight. The dosage of ozone can be about 1,000 g/hr. The volumetric ratio of ozone to liquid is typically around 2:1. In addition, where hydrogen peroxide is used in combination with ozone, the maximal percent hydrogen peroxide feed solution is about 30% by volume.

Processes of the present invention are typically performed under pressures of between about one and four atmospheres and are preferably performed at pressures of between about one and three atmospheres. It is noted, however, that when ozone and hydrogen peroxide are combined in the oxidation reactions, reaction pressures should be kept below 5 atmospheres, based on the data shown in the Examples. Pressure for the reactor would be less than that which could prompt explosive characteristics for the oxidation reaction, particularly with regard to ozone. Note, however, that although not optimal, slightly higher pressures could be used in the system and embodiments of the present invention and these pressures are envisioned to be within the scope of the present invention.

Processes of the present invention are typically performed in a waste fluid having a pH of between about 7 to about 11, and usefully about 10 where the combination of ozone is used with hydrogen peroxide. Preferred materials for adjusting the pH of the waste fluid includes NaOH, when the waste fluid is below 7, and HCl or $H_2SO_4$, when the waste fluid is above 11.

In addition, process temperatures are typically modified to be about between ambient to about 100° C. Note that for purposes of the present invention, ambient temperature is typically between about 20° C. and about 30° C., although it is noted that an ambient temperature is the temperature of the environment or room that exists in accordance with the present invention.

Applicants summarize certain process parameters. $K_1A$ ranges between about 0.01 to about 2.0 sec^-1, alternatively between about 0.02 to about 1.0 sec^-1 and usefully between about 0.05 to about 0.5 sec^-1. Liquid residence time is between about 0.5 to about 6 min, alternatively between about 1 to about 4 min, and usefully between about 1 to about 3 min. Gas residence time is between about 0.5 to about 4 min, alternatively between about 0.5 to about 3 min, and usefully between about 0.5 to about 2 min. Ozone (gas) concentrations is between about 1 mg/l to 500 mg/l, alternatively between about 5 to about 250 mg/l, and usefully between about 10 to about 200 mg/l. Alternatively, ozone concentration is from about 6 to about 8% by volume. An ozone utilization rate is between 100 and 1000 grams per hour. Organic (liquid) concentrations is from about 0 to about 1000 ppmw, alternatively from about 0 to about 800 ppmw, and usefully from about 0 to about 600 ppmw. Effective life of ozone is determined from an ozone utilization factor. That factor is determined from a first order decomposition rate for ozone in the water to be treated. Typical factors range from about 0.05 sec^-1 to about 2 sec^-1. Ozone loses its effectiveness when 90+% of ozone has reacted.

The processes, reactors and systems of the present invention are useful in the destruction, i.e., partial to complete oxidation, of organic and/or inorganic contaminates, i.e., up to and exceeding about 3,000 mg/l. Contaminates can be in solution or suspended as solids within a solution. Note that processes of the present invention can be performed and repeated until the level of contaminates within the waste fluid is at an acceptable, pre-determined level. Note that embodiments of the present invention provide a significant time benefit for the amount of time required to treat a waste fluid, a benefit not available with other conventional oxidation-based technologies, i.e., destruction of contaminates in minutes and not hours.

FIG. 1 is a flow diagram of one embodiment of the general process of the present invention. A waste fluid is provided 100 for treatment in accordance with the present invention. The pH and temperature of the waste fluid is adjusted, if necessary, to a pH adjustment 101 of between about 6 and about 10, and more likely from about 8 and about 10, and to a temperature of between about ambient temperature and about 100° C. In embodiments of the present invention that utilize hydrogen peroxide, the hydrogen peroxide 102 is added to the waste fluid. The waste fluid may also be diluted with water to obtain the proper viscosity or contaminate concentration. Each of these reaction parameters may be monitored during the waste fluid treatment process and further adjusted to maintain the parameter within the appropriate range, as described above. An appropriate catalyst optionally may be added to the waste fluid to enhance potential oxidation reaction rates within the waste fluid.

The waste fluid then proceeds to an oxidation reactor 103 where ozone 104 and waste fluid are added to the reactor concurrently or via a "co-current flow," that is, the waste fluid and ozone move through the reactor in the same direction. The co-current flow of ozone and waste fluid provides maximal contact between the contaminates in the waste fluid and the ozone. The co-current flow within the reactor is substantially laminar, a plug flow of co-currently introduced fluids. To facilitate plug flow within the reactor, a series of surfaces are provided to limit dispersion flow within the reactor, these surfaces also serve as mass transfer sites within the reactor for oxidation reactions to occur.

Processes of the present invention provide that reactor pressures may be modified to optimize treatment of the contaminates from between about one atmosphere and about five atmospheres, and typically from between about one atmosphere and three atmospheres. Treated waste fluid 105 and gas 106 exit the reactor, where the waste fluid may be treated in another oxidation reactor 107 connected in series with the first oxidation reactor. As with the initial oxidation reactor, ozone is added concurrently to the second oxidation reactor with the once treated waste fluid. The processes of the present invention recognize that the number of oxidation reactors for use with the present invention is dependent upon the level of contaminates within the waste fluid; a sufficient number of reactors may be utilized to treat a particular waste fluid until the contaminate level within the waste fluid is deemed acceptable by the user.

As the waste fluid is being sufficiently treated to limit the level of contaminates in the waste fluid, the off-gas is treated in an off gas treatment system 108. Off gas treatment systems of the present invention separates entrained waste fluid from off gas, where the off gas is further treated via bimetallic catalytic destruction. A further description of the off gas treatment system is provided hereafter.

Reactors for the Destruction of Contaminates in a Waste Fluid

The present invention provides embodiments of a plug flow reactor in accordance with the present invention. Reactors of the present invention provide highly effective and efficient oxidation of contaminates in a waste fluid. Reactor designs of the present invention are based on the following interrelated conditions: (1) using a plug flow or laminar flow of the waste fluid through the reactor, this provides for non-turbulent flow within the reactor, i.e., as compared to dispersion flow, which calls for turbulent flow or back mixing throughout the reactor; (2) using pressures of between about one and about three atmospheres within the reactor, this facilitates bubble contact with the waste fluid by limiting the size of the oxidant bubbles and increases mass transfer and limits sparging of ozone and volatile organic compounds (VOCs); (3) using a co-current flow model of the waste fluid and oxidant through the reactor, this facilitates the amount of time that the oxidant and waste fluid are in contact within the reactor, i.e., the waste fluid and oxidant enter at approximately the same area of the reactor and flow in the same direction; and (4) providing conditions that maximize mass flow transfer within the reactor by modifying the waste fluids pH (for enhanced oxidation reaction kinetics), providing surface areas for the oxidation reactions, use of the co-current flow, use of catalysts, etc.

Figure 2:
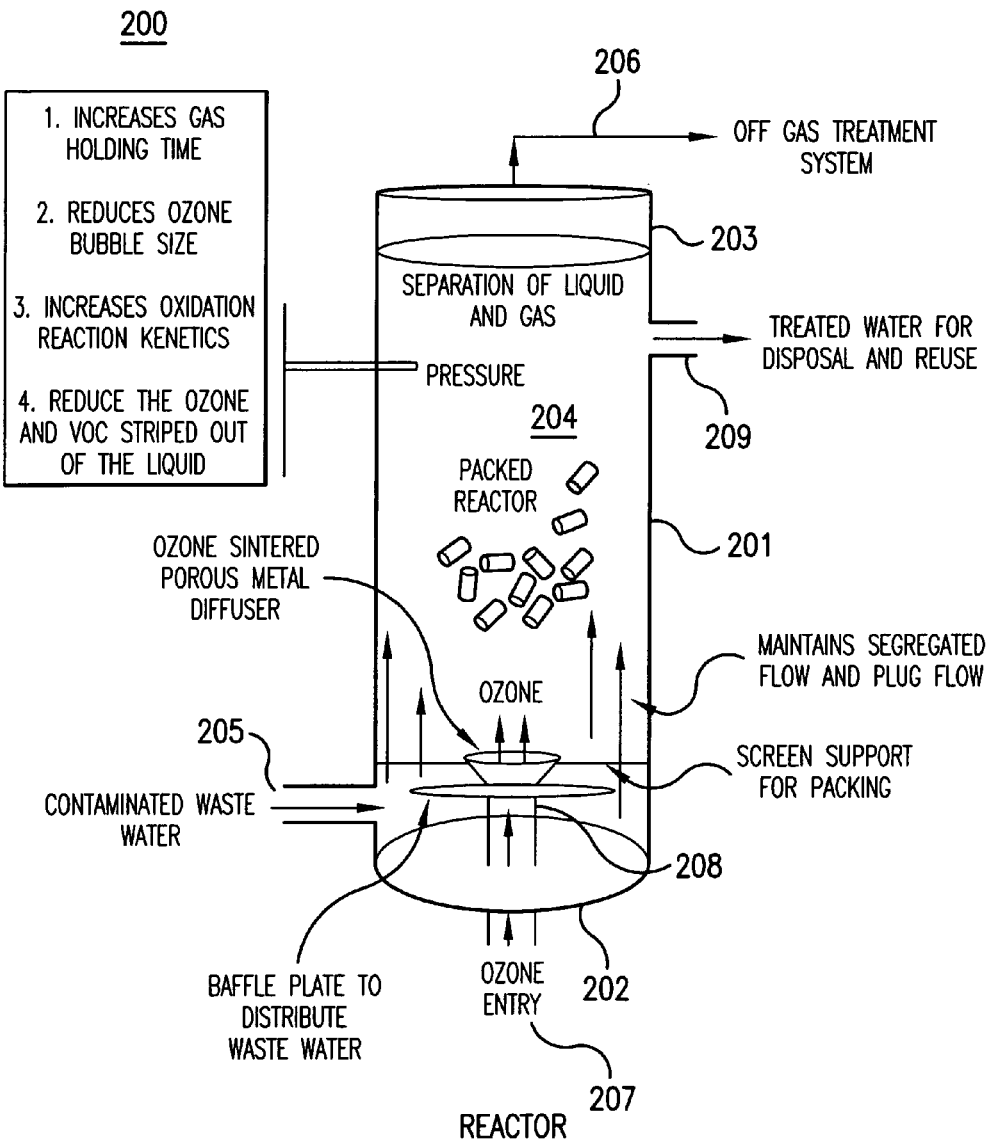
FIG. 2 is a diagram of a reactor for the treatment of a waste fluid in accordance with an embodiment of the present invention.

Referring to FIG. 2, a reactor diagram is shown in accordance with the present invention. In one embodiment, a reactor 200 includes a housing 201 with a first end 202, a second end 203 and a middle portion 204. The housing 201 defines a chamber for containing a waste fluid and oxidant, which typically is cylindrical in shape. The inside chamber wall is typically smooth to limit the formation of turbulent flow conditions within the location of the reactor housing, but rather represent the zones found at typically opposite locations of the housing. An inlet port 205 is located toward or at the first end of the housing and an outlet port 206 is located toward or at the second end of the housing. The inlet port receives pH adjusted waste fluid. Hydrogen peroxide also may be combined with the waste fluid. Gas inlet port 207 is used to introduce ozone, its precursors and reaction complements to reactor 200. The outlet port at the opposite end of the reactor releases treated waste fluid from the reactor. The inlet and outlet port can be located at the first and opposite ends respectively, but alternately can be located elsewhere in the reactor or otherwise associated with the reactor commensurate with the reaction mechanism. Also note that although only one inlet and outlet port are disclosed in FIG. 2, it is envisioned that multiple ports can be included in the housing as long as the reactor comports with the functions discussed above, especially in relation to the co-current flow and plug flow of waste fluid through the reactor.

A diffuser device 208 is located in the middle portion 204 of the housing 201 between the first 202 and second 203 ends. The diffuser device 208 conforms to the shape of the chamber walls so as to form a barrier within the chamber between the first and second ends of the housing.

The diffusion device 208 is a diffuser plate having a plurality of small openings for release of ozone gas into the waste fluid. Diffuser plates can be a screen or made of sintered metal, ceramic or other material. The diffuser device 208 is logically located approximate to the bottom end of the reactor. The plate can be sintered material with porosity between about 0.2 and about 100 microns of about 5 to about 20 microns with 10 microns being useful.

The middle of the reactor 204 is typically packed with a series of surfaces, usually a series or arrangement of Raschig rings or similar articles known in the art to provide surfaces for the oxidation reactions and to facilitate and promote plug flow of fluid through the reactor.

It is also envisioned that in embodiments of the present invention, a diffuser device would not be located within the housing of a reactor. Rather, ozone would be diffused into the waste fluid just prior (outside) to entrance into the reactor (not shown). A device such as an eductor or other like device can be used to diffuse the ozone into the fluid. These reactor embodiments therefore, would include a single chamber for performing the processes of the present invention, there being no requirement for a diffuser device. Other like devices can also be used to accomplish ozone diffusion into the waste fluid wherein such devices effect the reaction kinetics, reaction rates and efficiencies, residence time, flow dynamics, mass transfer and gas/liquid interface characteristics according to the present invention.

Figure 3:
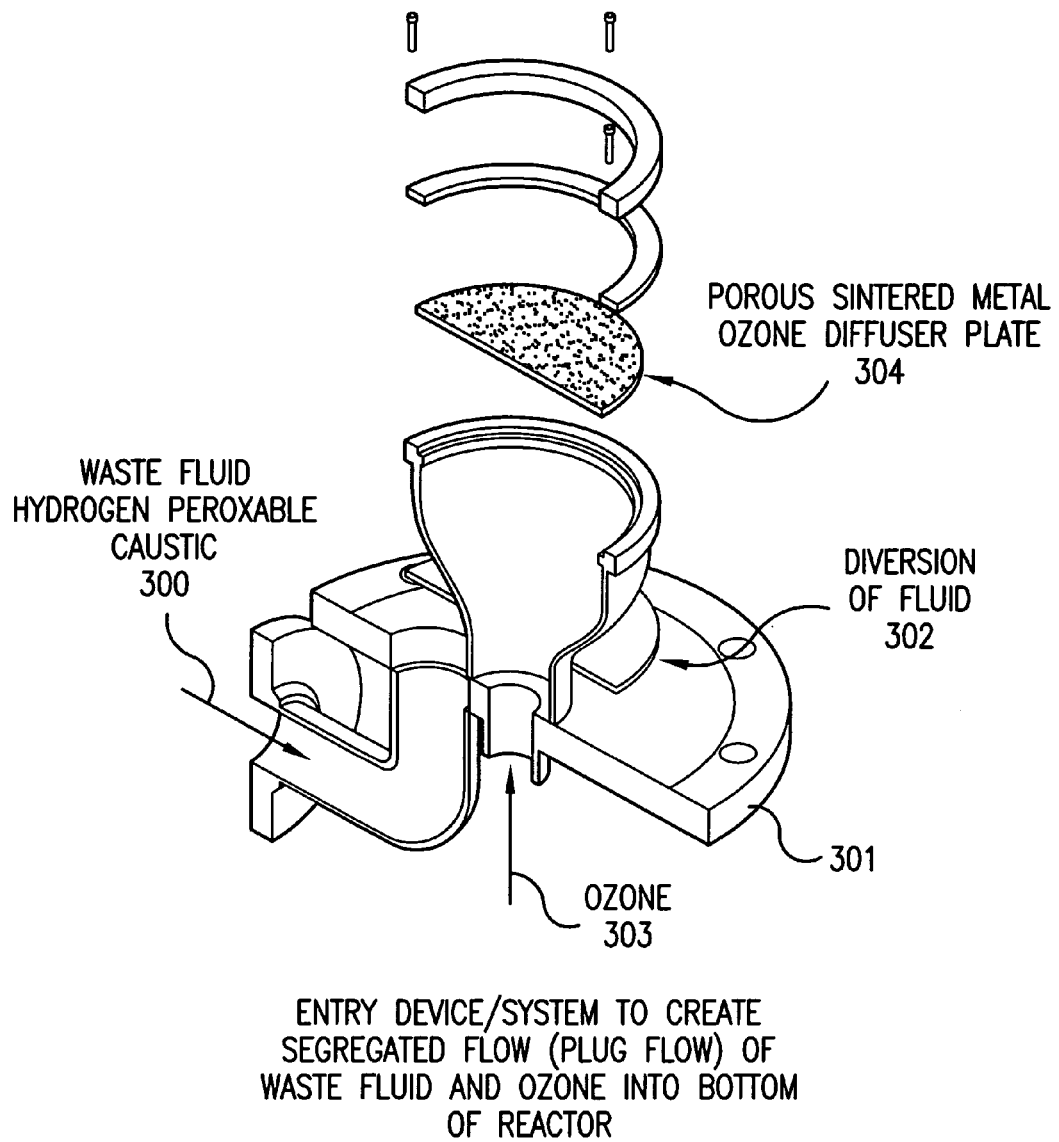
FIG. 3 is a diagram that illustrates a co-current flow arrangement of the waste fluid and ozone into a reactor in accordance with an embodiment of the present invention.

FIG. 3 shows an illustrative embodiment of a reactor having an inlet port 300 located at a first end of the reactor. A module 301 is positioned within the reactor for receiving ozone. The outside wall of the module forms an annular zone inside the reactor. Untreated waste fluid is more uniformly distributed within the reactor by baffle 302 and over the module wall. A packing screen keeps Raschig rings from entering the module or annular zone.

Ozone is received in the module through inlet port 303. A diffuser device 304 releases small bubbles of ozone into the passing waste fluid in a co-current flow. The co-current flow inlet arrangement maximizes plug and co-current flow of the waste fluid and ozone throughout the reactor. The embodiment minimizes turbulence of the waste fluid above the diffuser device.

Packed Raschig rings provide numerous surfaces or a series of surfaces for the mass flow transfer reactions of the present invention as well as facilitate plug flow of the waste fluid and ozone gas through the reactor. Other like materials can be used in place of the Raschig rings.

The following parameters illustrate the present invention. The reactor is designed to have the waste fluid reside within the reactor housing for less than five minutes, the flowrate through the reactor is about 5-50 gallons per minute. An example for a 10 gpm reactor, the reactor housing would be about 25 cm in diameter by eight feet in length. The reactor would be packed with 0.5 inch ceramic Raschig rings.

Figure 4:
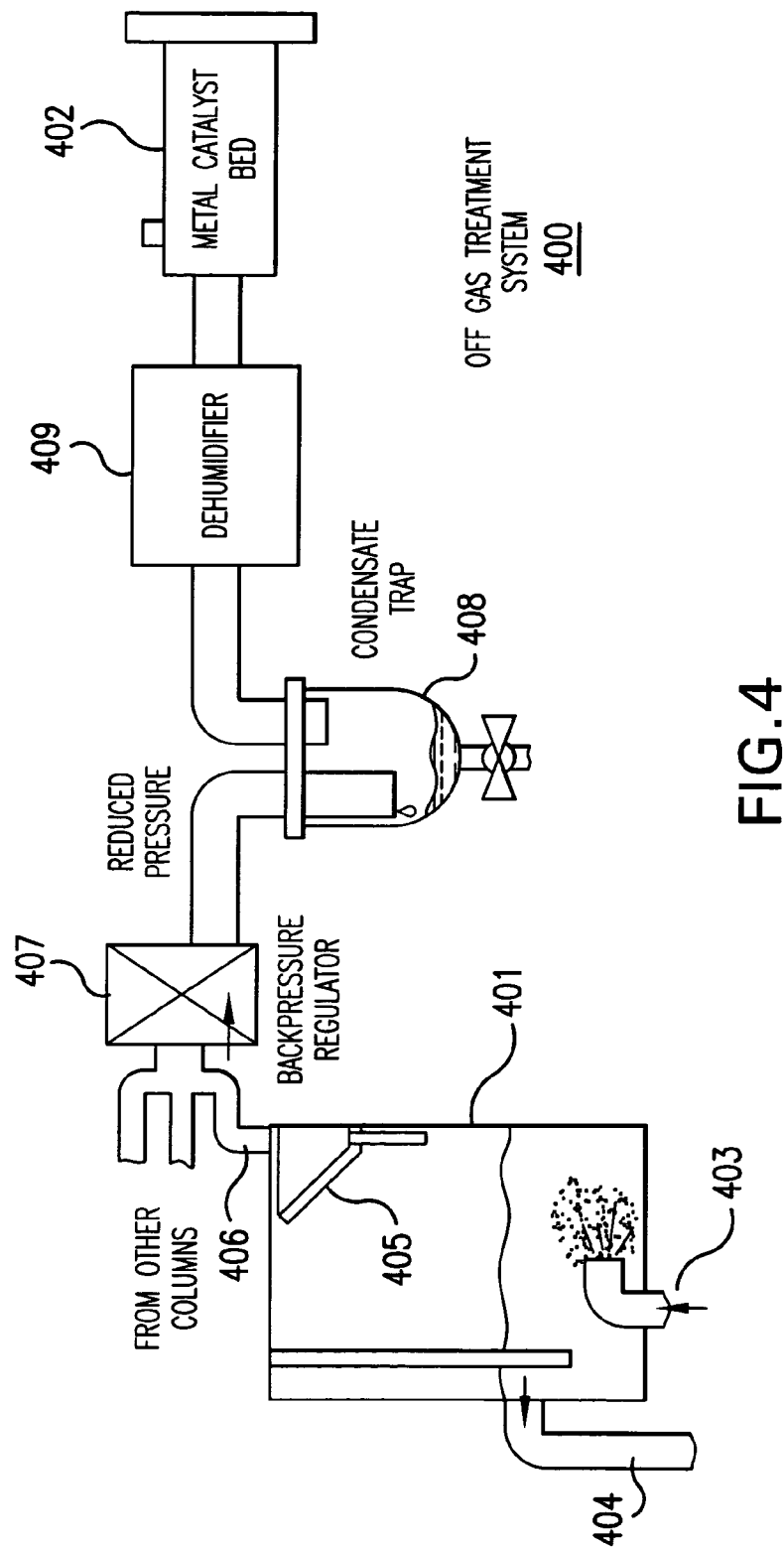
FIG. 4 is a diagram of an off gas treatment system for the separation of treated waste fluid from off gas and the further destruction of the off-gas in accordance with an embodiment of the present invention.

In another embodiment, reactors of the present invention are connected to an off gas treatment system 400. As shown in FIG. 4, the off gas treatment system 400 of the present invention has a flash chamber 401 in gas communication with a bimetallic catalyst treatment chamber 402.

Flash chamber embodiments of the present invention include a treated waste water inlet 403, an outlet 404 for waste water that has been substantially separated from gas within the treated waste fluid, a barrier 405 to facilitate release of the gas from the treated waste fluid, and an off gas outlet 406 for release of off gas from the flash chamber and into the bimetallic catalyst chamber 402. The system can include a back pressure regulator 407, a condensate trap 408 and a dehumidifier 409.

In more detail, the flash chamber 400 receives treated waste fluid from a reactor or reactors. The treated waste fluid enters the chamber through an inlet 403. The inlet 403 is in fluid communication with the outlet port (not shown in this figure) of the reactor. Waste liquid is separated from gas. Gas is available for release from the flash chamber into a bimetallic catalyst treatment chamber.

Other devices can be used in place of the flash chamber for separating bubbles out of liquid, for example, a scrubber.

Off gas treatment in the bimetallic catalyst treatment chamber is accomplished by contact of the off gas with a combination of bimetallic catalyst, for example, a bimetallic combination of platinum (Pt) and palladium (Pd). Other bimetallic combinations or metallic material are envisioned for use within the present invention. Off gas is heated to about 150° C. in the bimetallic catalyst treatment chamber.

Systems for the Destruction of Contaminates in a Waste Fluid

The present invention provides embodiments of waste water treatment systems in accordance with the present invention. Treatment systems of the present invention provide cost effective treatment, especially in relation to conventional techniques, of contaminates in a waste fluid. Treatment systems of the present invention provide the combination of devices necessary to practice process embodiments of the present invention and incorporate the reactor embodiments of the present invention.

The systems (and processes) of the present invention can be designed as stand-alone units, i.e., provided at the source of the waste fluid and release treated waste fluid into a predetermined site. However, the systems of the present invention may also be adapted for use with existing water treatment facilities or plants as a "turn-key" or "bolt-on" process that, for example, focus on the removal of bacteria and particulates from a water source. As such, the present invention may be added to existing water facilities as a first treatment, intermediate or final step to destroy contaminates within the waste fluid prior to treatment of the waste fluid within a waste treatment facility. Note also that the systems of the present invention are portable and can be designed for transport in trailers or other like platforms to contaminated sites, for example to a well located in a high organic contaminated ground water area.

Figure 5:
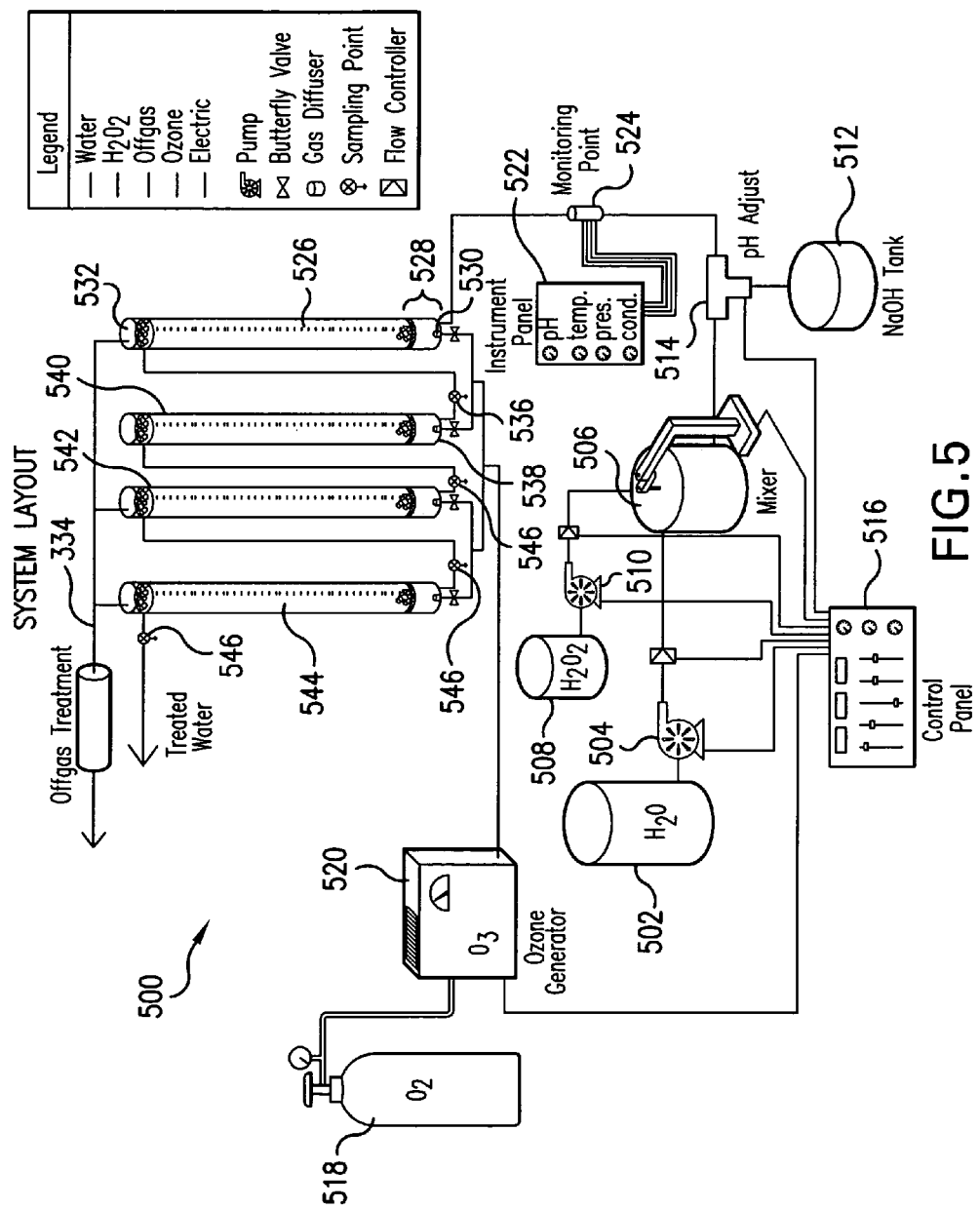
FIG. 5 is a schematic for a waste fluid treatment system in accordance with an embodiment of the present invention.

Referring to FIG. 5, a system 500 is shown in accordance with the present invention. In one embodiment, waste fluid can be stored 502 or obtained from a source. Typically, waste fluid for treatment by systems of the present invention can have contaminate levels as low as 1 mg/l and as high as 3,000+ mg/l. Note that any level of contaminates in a waste fluid can be treated by the systems of the present invention, where additional capacity, i.e., reactors, can be added to a system in accordance to the amount of waste fluid to be treated, the time requirement for the treatment of the waste fluid, and the contaminate levels within that waste fluid. As such, a system designed to treat a lower level of contaminates may only require one or more in-series reactors whereas a system may also be designed to treat a higher level of contaminates by placing up to six reactors in the system in series.

Waste fluid is pumped by a pump 504 to a mixing vessel 506. In one embodiment of the system, hydrogen peroxide is stored in a storage vessel 508 for addition via a pump 510 to the waste fluid in the mixing vessel 506. Mixed waste fluid is monitored for pH and appropriate amounts of either sodium hydroxide 512 (or other like base) or hydrochloric acid (or other like acid) are added to the fluid 514 to maintain a pH of between 7 and 10, and alternately between 8 and 10 within the waste fluid. Temperature of the waste fluid is between about ambient temperature and about 100° C. If temperature adjustment is needed a heat/cold device can be used (not shown).

Optionally, a control panel 516 monitors and controls the amount of waste fluid passing through the system, the amount of hydrogen peroxide added to the waste fluid, the temperature of the waste fluid, and/or the pH of the waste fluid. As discussed in greater detail below, the control panel also offers monitoring and control over the addition of ozone from an ozone source 518, via an ozone generator 520, to the waste fluid. An instrument panel 522 can provide the system operating parameters for visual inspection.

Temperature, pH and hydrogen peroxide adjusted waste fluid moves through the monitoring point 524, where the waste fluid parameters are displayed on the instrument panel 522. Data from the monitoring point is relayed to the control panel for either automatic or manual mediated control over the parameters. For example, waste fluid that passes the monitoring point with a pH of 5 will indicate to the controller at the control panel 516 to increase the amount of base added to the waste fluid.

The waste fluid then moves to a first reactor 526. As discussed in detail above, the waste fluid enters the reactor at a first end 528, the first end logically located at the bottom of the reactor. Ozone 518 is added to the waste fluid either just prior to entering the reactor 526 or via an inlet 530 into the reactor located at a point to maximize the concurrent flow of the waste fluid and ozone through the reactor. Treated waste fluid exits the first reactor via a second end 532, the second end logically at the top of the reactor. Treated waste fluid can optionally be treated in a off gas treatment system, as illustrated by arrow 334 (Offgas Treatment).

A sampling point 536 is optionally located in-line with the treated waste fluid from the first reactor. Systems of the present invention are designed to incorporate as many in-series reactors as are required to destroy the contaminates present in the waste fluid. Waste fluid treated in the first reactor would next be received at a first end 538 of a second reactor 540, and as above, a fresh supply of ozone would be added to the waste fluid to maximize concurrent flow of ozone and waste fluid through the second reactor. Third 542 and fourth 544 reactors are shown with appropriate sampling points 546 to illustrate that a plurality of reactors may be incorporated in-series for the treatment of waste fluids. Once waste fluid has been treated and the off gas destroyed via an offgas treatment system (see above), the waste fluid is exited from the system for downstream use, or alternative treatment, for example the treatment of the waste fluid for destruction of bacteria.

Determination of the number of reactors can be determined via computer modeling under conditions as described in Example 3. In addition, system parameters for a particular waste fluid source may be determined through experimentation and pilot based trial runs to optimize system parameters.

Note that additional ozone and hydrogen peroxide may also be added to the waste fluid in-between each reactor or alternatively every other reactor run (not shown in FIG. 5). In this way, ozone and hydrogen peroxide concentrations can be maintained at the start of each reactor run.

The invention will now be described with respect to its operation according to the present invention utilizing the present apparatus. FIG. 1 shows a flow diagram of the present invention. Contaminated water in unit 100 is pumped to the reactors. Containers 101 and 102 supply a pH adjustment vehicle, for example, hydroxide, and hydrogen peroxide to the contaminated water to facilitate treatment in reactor 103. Ozone is supplied to a desired reactor from supply unit 104. These fluids, that is, the liquid and the gas enter co-currently to reactor 103. Gas is disbursed in liquid and the fluid flows through the center of the reactor column. Liquid is separated from the gas. Liquid exits the reactor at 105 and gas exits the reactor at 106. Gas can exit to the atmosphere or be recycled for use in the reaction while condensate is collected. Multiple units are envisioned but the number of units is reduced compared to known processes as a result of the improved efficiency of the reaction. Effluent from outlet 105 can be processed in a series of reactors in sequential fashion. The ozone can be supplied to such reactors in parallel as shown in FIG. 1. Substantially contaminant free effluent can be collected at unit 109.

Figure 10:
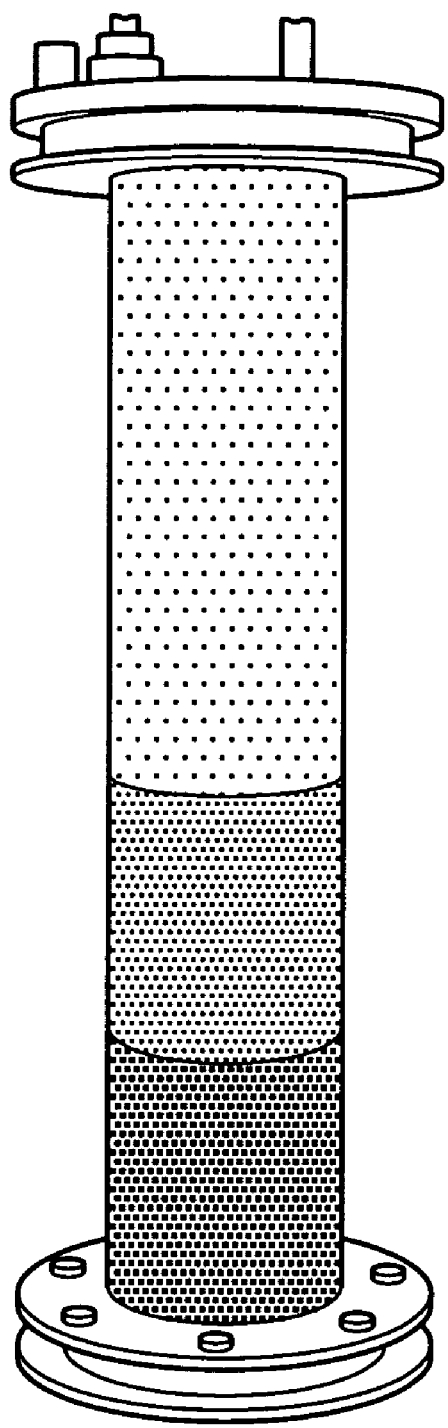
FIG. 10 is a black and white photograph of indigo dye fading reaction with ozone to measure mass transfer coefficients in a packed column.
Figure 11:
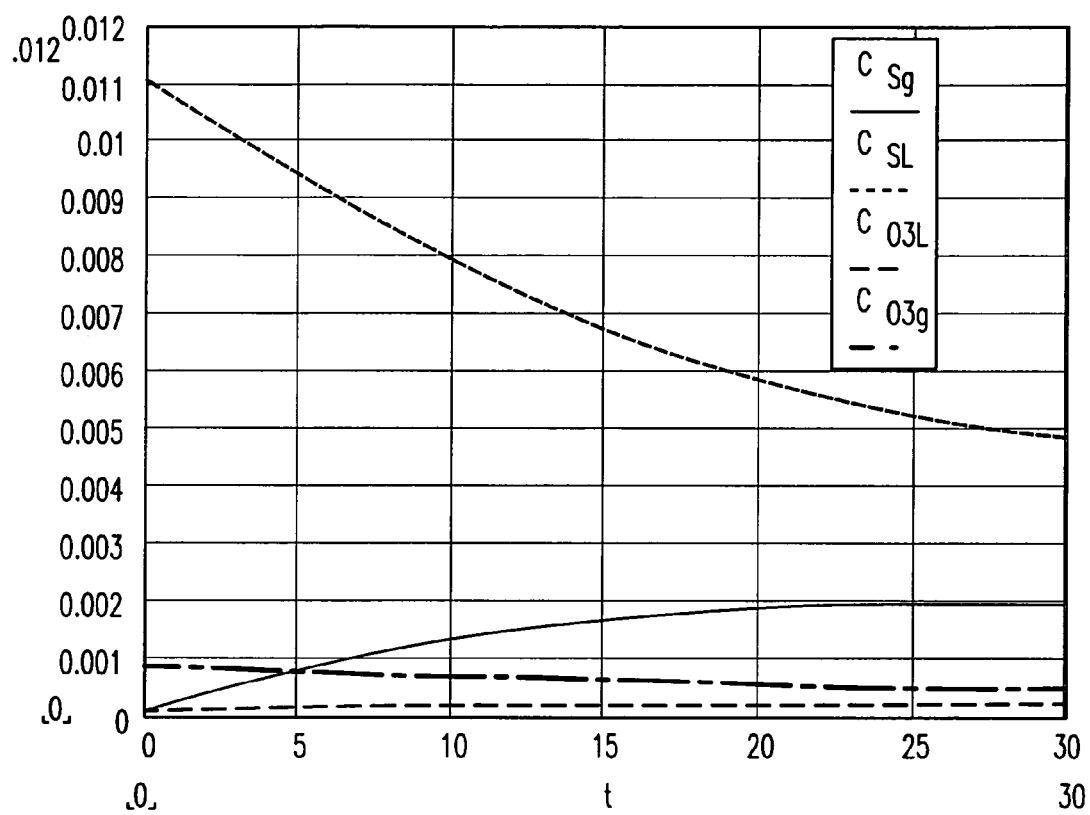
FIG. 11 is an illustrative plot of atmospheric pressure ozone destruction ($O_3$-4%) in accordance with the present invention. Concentration (gmol/l) vs. time (sec.). $C_{Sg}$—gas phase organic, $C_{SL}$—liquid phase organic, $C_{O3L}$—Liquid phase ozone, $C_{O3g}$—gas phase ozone.

The reactor is depicted in detail in FIG. 2. Contaminated waste water containing hydroxide and hydrogen peroxide enter beneath the baffle plate facilitating its distribution. Ozone enters a diffusion device 208 through inlet 207. The contaminated waste water and additional components combine with the diffused ozone uniformly in the manner which avoids back mixing. The diffusion device includes a porous portion having a porosity in microns facilitating an increase in the interfacial surface of the bubbles developed by the gas passing through it. Such a portion can be made of metal or ceramic sintered or otherwise constituting the diffuser. The combination of fluids proceeds through the reactor in plug flow. FIG. 10, discussed in greater detail hereafter, pictures that flow through the reactor column. As shown, it is substantially horizontal in cross section passing from bottom to top of the reactor column. This shows the substantial absence of back mixing which defines the plug flow regime through the central portion of the reactor 204. FIG. 10 shows laminar flow of the combination but also plug flow of the combination. The combination has a uniform horizontal movement of the combination of liquid and gas and that horizontal uniformity continues vertically through the reactor.

The reactor has a series of surfaces which facilitates this plug flow. The residence time of the combination is increased and the reaction is thereby facilitated. The series of surfaces can be raschig rings or equivalents therefore.

The reactor is typically under pressure and that pressure is less than 3 atm. The pressure increases the gas holding time, reduces ozone bubble size, increases oxidation reaction kinetics, and reduces the ozone and the VOC stripped out of the liquid. This reaction occurs during the useful life of the ozone which necessitates ozone mass transfer characteristics to conform to that lifetime. The inter-relationship of foregoing characteristics permit the physical size of the devices to be substantially reduced compared to that used in conventional treatments. Thereafter, gas and liquid are separated. Off gas exits at 206 and treated water exits both beneath it.

Pressure increases the gas holding time, reduces ozone bubble size, increases oxidation reaction kinetics, and reduces the ozone and the VOC stripped out of the liquid. This reaction occurs during the useful life of the ozone which necessitates ozone mass transfer characteristics to conform to that lifetime. The inter-relationship of foregoing characteristics permits the physical size of the devices to be substantially reduced compared to that used in conventional treatments. Thereafter, gas and liquid are separated. Off gas exits at 206 and treated water exits 209 both beneath it.

Figure 6:
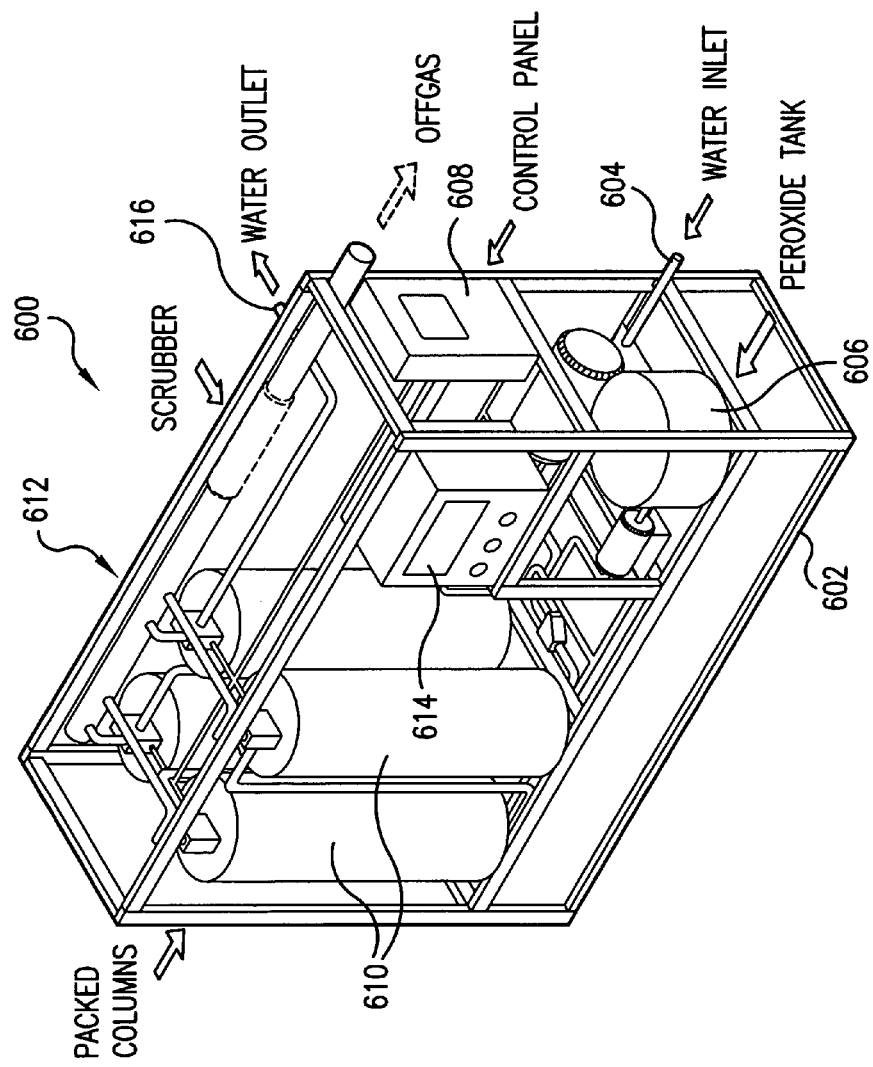
FIG. 6 is a perspective view of a waste fluid treatment system in accordance with an embodiment of the present invention.
Figure 7:
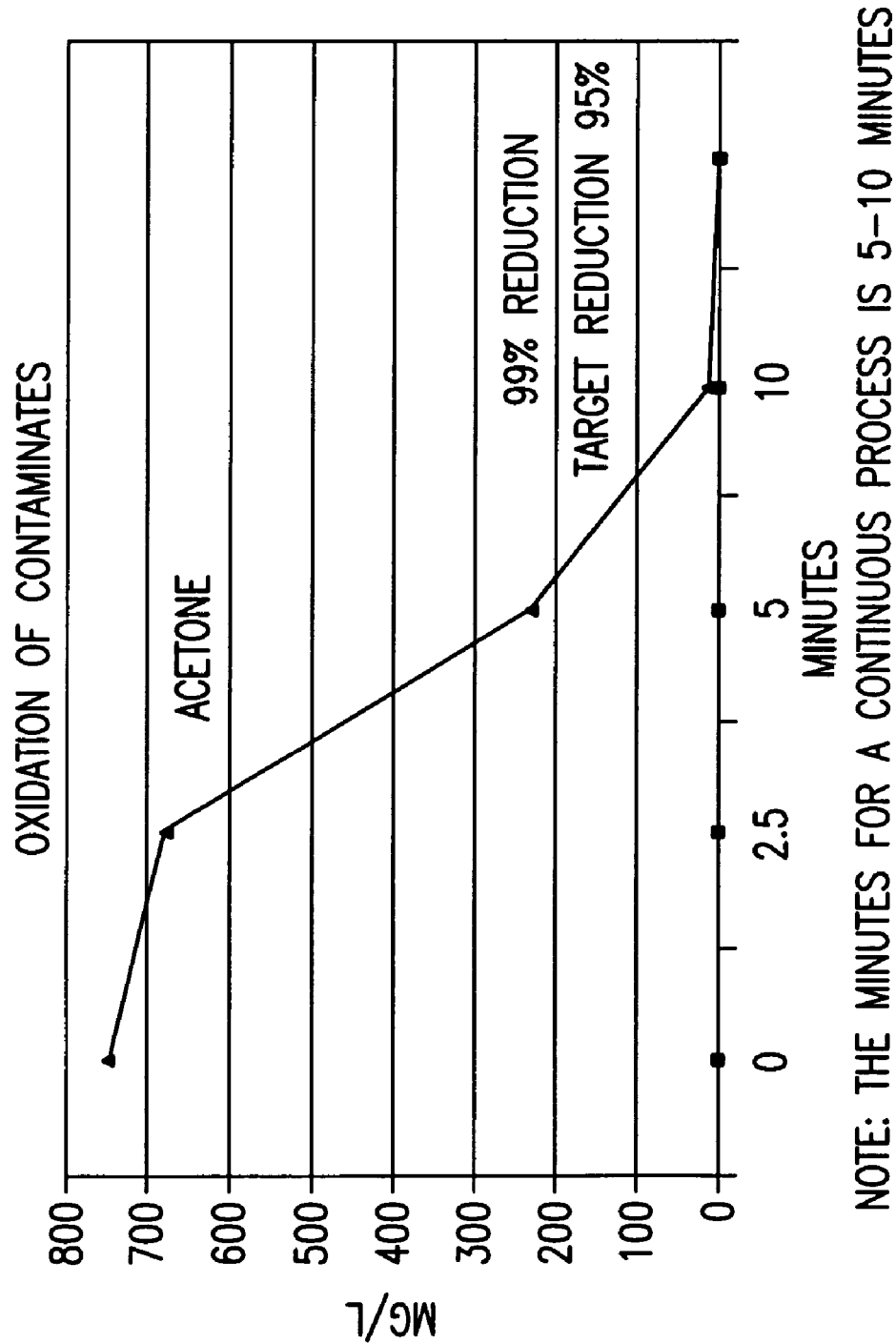
FIG. 7 is an illustrative plot showing acetone levels over the course of an removal/degradation reaction in accordance with the present invention.
Figure 8:
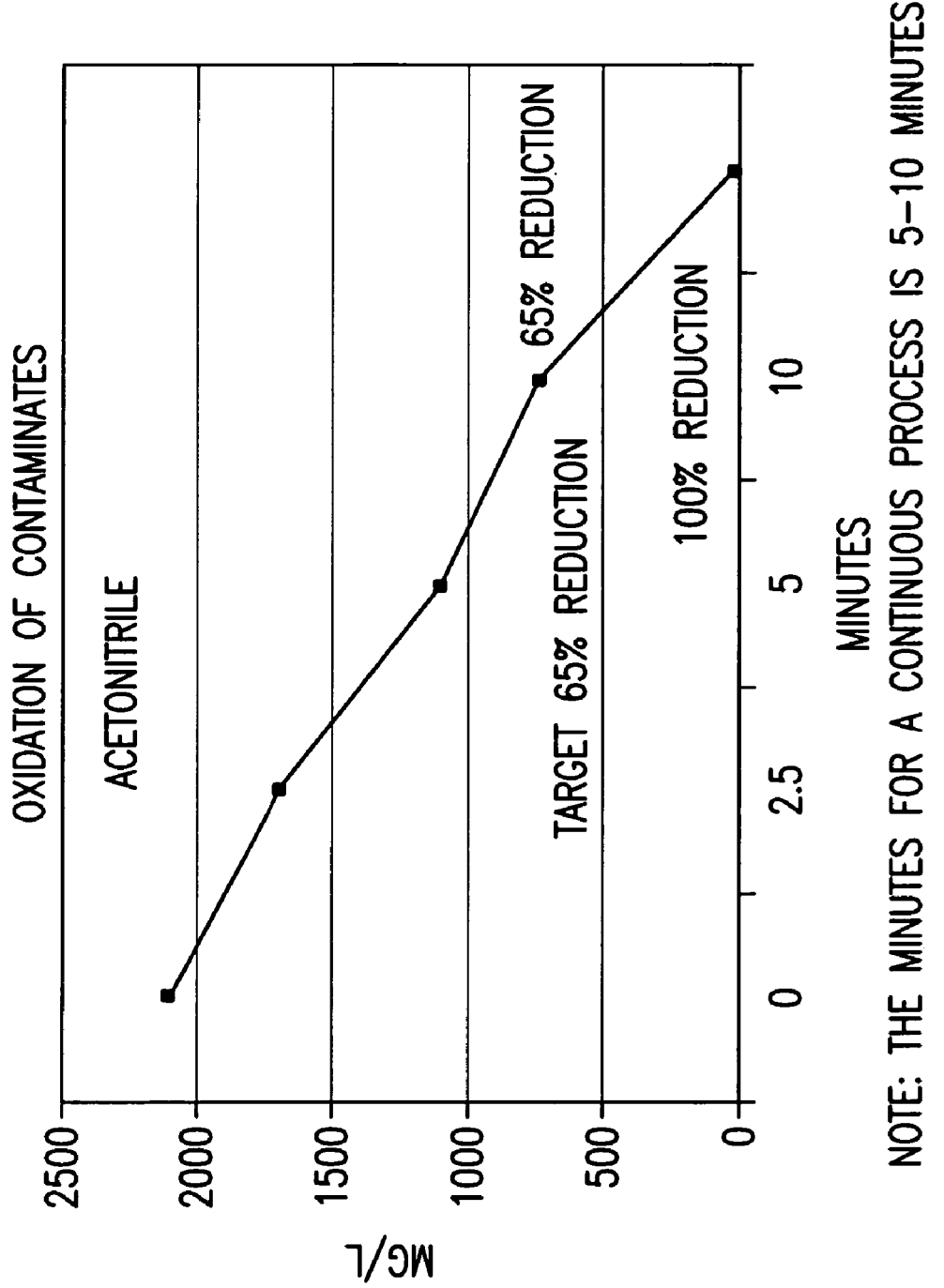
FIG. 8 is an illustrative plot showing acetonitrile levels over the course of an removal/degradation reaction in accordance with the present invention.

FIG. 3 shows the diffuser device which includes in that figure a sintered metal ozone diffuser plate. This exploded view of the schematic representation of the diffuser device 208 in FIG. 2 shows waste fluid hydrogen peroxide and hydroxide or caustic entering beneath a baffle 302 which facilitates uniform dispersion of that liquid combination. FIG. 3 further shows ozone inlet 303 which enters a conical portion having the baffle 302 attached to it and the diffuser plate sitting thereabove enclosing the end of the device. The device coordinates the movement of fluid and gas bubbles as they enter the reactor and proceed through the center portion of the reactor. A system layout and commercial systems are shown in FIGS. 5 and 6 respectively. FIGS. 7 and 8 show the percent reduction of contaminants to be on the order of about 99%.

The present invention is directed to the aqueous phase oxidation of organic aqueous contaminants with minor transfer of contaminants to the gas phase. The present invention achieves this oxidation through a mixed phase (gas-liquid) co-current, plug flow reactor for ozonation reactions. This contacting method reduces the size of the reactor required by 1 to 2 orders of magnitude over known systems. The packing material of the column enhances the gas liquid mass transfer rate to be comparable to the rate of the oxidation reactions. Where more than one reactor is utilized, each individual reactor is co-current, with several reactors in series to achieve complete degradation of the organic. Gaseous ozone is added in parallel to each reactor with the liquid flowing through each reactor in series. This creates a unique cross flow type of reaction geometry. The liquid residence time in each reactor has been scaled to the useful lifetime of the dissolved ozone, approximately 2 to 3 minutes. Computer simulations of the systems indicate that the optimal useful ozone concentration is 6 to 8 volume percent and the system can be pressurized to about 3 atmospheres absolute (about 43 psia) to enhance performance. Use of pressurized ozone reduces gas phase stripping of organic contaminants. Use of air tends to enhance stripping of volatile organics. Gas to liquid volumetric ratio of about 2:1 is useful to reduce stripping of the organics from water. The use of dilute hydrogen peroxide (0.5% to 3% by weight) will enhance by about 20 to 50% the degradation rate. Typically, this is most effective if the pH of the water is mildly basic about pH equal to 10.

As mentioned, the chemistry of advanced oxidation reactions can be quite complex. Rate constant for the entire network of reactions is virtually impossible to decipher. Applicants do not wish to be bound by a particular mechanism for the present invention. They purport that an integration of the proper set of process parts, contacting patterns, residence times, have a developed an integrated system which makes use of ozone and peroxide far more effective than that known.

The mass transfer coefficient is typically described as a $K_1 A$, where the $K_1$ term is the transfer rate per unit of interfacial area per unit time (i.e. $-1/\text{meter}^2 \cdot \text{min}$). The A term is the interfacial surface area in a given volume of reactor ($\text{meter}^2/\text{meter}^3$). When multiplied times the concentration difference across the interface (concentration in the gas–concentration in the liquid), the mass transfer rate is obtained (moles/min) from one phase to the other. The mass transfer rate can be increased by producing more interfacial area (e.g.—smaller bubbles, high area packing), the concentration in the gas phase, or by changing $K_1$ via more mixing or higher fluid velocities. The present invention currently achieves a $K_1 A$ of approximately 0.01 to 0.5 $\text{sec}^{-1}$ using Raschig ring packing, but with other, higher efficiency packings, one might get as high as 2 $\text{sec}^{-1}$. This higher rate is comparable to the rate of the ozone reactions themselves, past which point increasing the mass transfer coefficient doesn't necessarily help. In other words, the present reactor is still mass transfer limited, but not by a significant amount. This is an advantageous region to operate in. Secondly, the residence time (which is directly tied to the flowrate) may be adjusted to most advantageously fit the overall rate of mass transfer and reaction. Whereby if all of the ozone is depleted, the reaction come to a halt. This is overcome in the present system by using a parallel addition of the ozone to reactors in series. These advantages can be accomplished in other types of reactors, but usually at the cost of plug flow, which is equally or more important.

The present system has an ozone mass transfer coefficient ($K_1$) of 0.05 to about 2 $\text{sec}^{-1}$. This represents ozone transfer in moles/min and consequently a rate of the oxidation reaction. This level of transfer and reaction rate determines reactor size and detention time in the reactor. This results in a significant increase in the present system efficiency. Where mass transfer is based on volume, transfer of ozone is in liters into a liquid in liters. This approach assures an adequate level of ozone for oxidation but does not reflect the rate of oxidation.

The following relationship is responsible for improved ozone mass transfer based on reaction rate (time):

1. In the present system, the reactor packing serves to improve the contact of ozone bubbles and liquid by creating good local contact and shear along the packing surface without creating back mixing.
2. In increasing the gas-liquid interfacial area by making small ozone bubbles by the porous diffuser plate at the bottom of the reactor and the elevated pressure in the reactor. The packing keeps the bubbles from growing in size and a wet surface for bubbles to pass over.
3. The ozone mass transfer can be increased by maximizing the difference across the gas-liquid interface. The present system does this by operating at an elevated pressure.

Viewing FIG. 10 which displays plug flow, visual observation of that experimentation forms a basis to say that the reactants move homogenously and vertically through the reaction column in cross section. This flow emanates from the combination of components established by the manner in which the components are introduced in the reactor. This suggest that components move through the reactor uniformly from the time of their introduction. The combination of components enhances the interfacial area which traverses through the series of surfaces or packing in the reactor. The dynamics of the reactor appears to permit maintenance of the interfacial area and localization of the reaction between gas and liquid from the time of introduction to the reactor. There appears to be a timing and rhythm during travels of gas and liquid through the reactor. Reaction rate appears enhanced and residence time is increased during the effective life of the ozone. The mass transfer rates utilized in this invention suggest the improved efficiency. The dynamics in apparatus essentially avoid back mixing and recombination or coalescence of gas bubbles in the reactor.

Having generally described the invention, the same will be more readily understood by reference to the following Examples, which are provided by way of illustration and are not intended as limiting.

EXAMPLES

Example 1

Combination of Hydrogen Peroxide and Ozone in Waste Fluid Partially Reduces the Organic Waste in a Waste Fluid The following example illustrates the effectiveness of the methods and compositions of the present invention for treating a waste fluid. Note that the present example utilizes sub-critical temperatures and pressures to obtain large decreases in the amount of organic contaminants from a starting waste fluid. Note also that relative to the amount of oxidizing agents used in connection with the present invention, large decreases in organic materials from the waste fluid is achieved. Such dramatic results are attributable to the formation of hydroxyl radicals in waste fluid that have enhanced reactivity with the organic contaminates in the waste fluid.

Liquid chemical waste obtained from a chemical plant, having approximately 760 mg/l acetone and 2,100 mg/l acetonitrile, was treated with hydrogen peroxide and then ozone added over a period of three hours. Samples were taken every hour to determine concentrations of acetone and acetonitrile over the course of the oxidation reaction. Results indicated that the combination of ozone and hydrogen peroxide were effective at causing oxidation of acetone and acetonitrile in the waste fluid.

In more detail, tests were initially performed on the untreated waste fluid to ensure that other known organic contaminates were not present, as organic contaminants could interfere with the interpretation of the oxidation data specific for acetone and acetonitrile. Gas chromatography and mass spectrometry confirmed that no other tested organic contaminant (35 were tested) was present in any substantial amount in the waste prior to treatment using the methods and compositions of the present invention (data not shown).

Hydrogen peroxide was added to the chemical waste and allowed to equilibrate. The waste was tested at ambient temperatures at approximately 1 atmosphere of pressure. A flow of ozone was introduced into the bottom of the vessel containing the peroxide treated waste. The ozone entered through a plurality of openings in the bottom of the vessel, thereby increasing the effective concentration of the ozone in relation to the peroxide treated organic contaminants. The pH was maintained throughout the run at between 4 and 8.

As shown in Table 1, compositions and conditions of the present invention are highly effective at oxidizing organic contaminants, e.g., acetone and acetonitrile, in a waste fluid. Under the limited and preliminary design parameters of the present example, approximately 30-50% oxidation was achieved. Based on extrapolation of these results, it is highly likely that a continuous process in accordance with the present invention could achieve almost up to 99+% oxidation in a relatively short amount of time, i.e., even as little as five minutes or less.

TABLE 1

Oxidation of Acetone and Acetonitrile (Partial Reduction)

| Sample | Acetone (mg/L) | Acetonitrile (mg/L) | Oxidation Time (hrs) |
|---|---|---|---|
| Untreated | 760 | 2100 | — |
| Treated | 740 | 2000 | 1 |
| Treated | 470 | 1700 | 2 |
| Treated | 410 | 1500 | 3 |
| Total Oxidation | 46% | 29% | | and pressures as low as 30-40° C. and 1 atmosphere can be used effectively with hydrogen peroxide and ozone to produce high levels of oxidation of chemical contaminants. These conditions show conditions that favor oxidation of organic contaminates within the waste fluid.

Example 2

Hydrogen Peroxide and Ozone Achieve Total Reduction in Waste Fluid Levels of Acetone and Acetonitrile The following example illustrates the effectiveness of the methods and compositions of the present invention for treating a liquid waste having high levels of acetone and acetonitrile. As in the previous two examples, the present example utilizes sub-critical temperatures and pressures to obtain near total reduction in the amount of measured contaminates from a starting waste fluid. In addition, the present results support a conclusion that embodiments of the present invention, using continuous flow conditions, would achieve near total oxidation of contaminates within a waste fluid in much faster times than achieved using conventional technologies.

Seven liters of liquid chemical waste was obtained from a chemical plant, the waste having approximately 750 mg/l acetone and 2,100 mg/l acetonitrile. The pH of the waste was maintained at about 7.5 at an ambient temperature. The chemical waste was continuously injected with ozone (see Tables 2 and 3). Due to the limitations in this lab-scale reaction, only a certain amount of ozone could be injected in any given period of time. The known flow of ozone gas was injected into the known volume of waste fluid. The concentration of ozone in the "off" gas was measured. The difference between the input and off gas ozone was the actual ozone consumed in the reactor.

Acetone and acetonitrile within the liquid chemical waste were destroyed by the consumed ozone. A primary design factor for this example was that the amount of ozone consumed in destroying the acetone and acetonitrile was determined to be the amount measured from an initial level, i.e., 750 and 2,100, to a desired or optimal level. Depending on the level of acetone and acetonitrile in the liquid chemical waste, the required amount of ozone was applied to the reactor in a matter of a few minutes or over many hours.

The data in Table 3 shows a compilation of raw data points shown in Table 2. Data form Table 2 is shown as FIGS. 12 and 13. Note that the raw data shown in Table 3 is obtained from a series of four runs under the conditions described above and indicated within the Table 2.

TABLE 2

Raw Data For Oxidation of Acetone and Acetonitrile (Example 3)

| Time Minute | Sample point | Acetone Level | % Red | Acetonitrile Level | % Red | COD Level | % Red | Ozone mg/L |
|---|---|---|---|---|---|---|---|---|
| Run 1 | | | | | | | | |
| 0   | 0 | 750 |     | 2100 |     | 4144 |     |      |
| 30  | 1 |     |     |      |     | 3992 | 4%  |      |
| 60  | 2 | 700 | 7%  | 2000 | 5%  | 3912 | 6%  | 465  |
| 90  | 3 |     |     |      |     | 3740 | 10% |      |
| 120 | 4 | 600 | 20% | 1700 | 19% | 3544 | 14% | 930  |
| 150 | 5 |     |     |      |     | 3364 | 19% |      |
| 180 | 6 | 510 | 32% | 1500 | 29% | 3156 | 24% | 1395 |
| Run 2 | | | | | | | | |
| 0   | 0 | 1300 |     | 2400 |     | 3632 |     |      |
| 20  | 1 |      |     |      |     | 3820 | -5% |      |
| 40  | 2 |      |     |      |     | 3580 | 1%  | 612  |
| 60  | 3 |      |     |      |     | 3364 | 7%  |      |
| 80  | 4 |      |     |      |     | 3224 | 11% | 1224 |
| 100 | 5 |      |     |      |     | 3068 | 16% |      |
| 120 | 6 | 680  | 48% | 1700 | 29% | 2988 | 18% | 1836 |
| Continuation | | | | | | | | |
| 120 | 0 | 540 | 58% | 1600 | 33% | 3232 | 11% |      |
| 140 | 1 |     |     |      |     | 3008 | 17% |      |
| 160 | 2 | 460 | 65% | 1600 | 33% | 2876 | 21% | 2448 |
| 180 | 3 |     |     |      |     | 2736 | 25% |      |
| 200 | 4 | 320 | 75% | 1300 | 46% | 2508 | 31% | 3060 |
| 220 | 5 |     |     |      |     | 2364 | 35% |      |
| 240 | 6 | 170 | 87% | 1200 | 50% | 2220 | 39% | 3672 |
| Run 3 | | | | | | | | |
| 0   | 0 | 950 |     | 1300 |     | 4148 |     |      |
| 240 | 1 | 230 | 76% | 1100 | 15% | 2644 | 36% | 4200 |
| 360 | 2 | 81  | 91% | 880  | 32% | 1864 | 55% | 6300 |
| 420 | 3 | 35  | 96% | 800  | 38% | 1616 | 61% | 7350 |
| 480 | 4 | 13  | 99% | 730  | 44% | 1352 | 67% | 8400 |
| Run 4 | | | | | | | | |
| 480 | 0 |     |     | 530 |     | 968  |     | 8400  |
| 540 | 1 |     |     | 410 | 68% | 686  | 83% | 10050 |
| 600 | 2 |     |     | 250 | 81% | 448  | 89% | 11700 |
| 660 | 3 |     |     | 150 | 88% | 284  | 93% | 13350 |
| 720 | 4 |     |     | 27  | 98% | 110  | 97% | 15000 |

Note that the bolded data points show selected data used to prepare FIGS. 7 and 8, also see Table 3

TABLE 3

Oxidation of Acetone and Acetonitrile (Example 3)

| Sample | Acetone (mg/L) | Acetonitrile (mg/L) | Time (minutes) | Ozone (mg/L) |
|---|---|---|---|---|
| Untreated Liquid Chemical Waste | 750 | 2,100 | — | — |
| Treated | 680 | 1,700 | 120 | 1,836 |
| Treated | 230 | 1,100 | 240 | 4,200 |
| Treated | 13 | 730 | 480 | 8,400 |
| Treated | — | 27 | 720 | 15,000 |

An analysis of the data shown in Table 3 was used to convert this "batch data" to data illustrating how long it would take to accomplish the same result using a continuous flow system. The contaminate data shown in Table 3 in mg/l was then plotted against actual batch times to determine the consistency of the continuous flow reaction, i.e., whether the test results were essentially linear. Test plots indicate that the data for acetone and acetonitrile have linear slopes, thereby allowing the conversion to continuous flow results.

A company that has done this type of oxidation on the bench scale outlined above was consulted regarding this conversion process. They had installed several commercial continuous flow systems, and they found that up to 99+% reduction of contaminates by oxidation occurred within one to fifteen minutes compared to batch times of 680 to 720 minutes (see Table 3).

Based on their experience, as well as some oxidation modeling, it was determined that each run remained linear when the time data from Table 3 was divided by a factor of 48, which gave the time in minutes for continuous flow:

Batch 680 mg/l at 120 minutes÷48=Continuous flow 680 mg/l at 2.5 minutes

This factor will vary dependent upon: (a) the type of contaminate; (b) the type of reaction used to form the hydroxyl radical; and (c) the linear trend reaction (±10%).

This case illustrates that the high level of dissolved acetone and acetonitrile in a liquid chemical waste can be destroyed in less than one hour and often within three to fifteen minutes, as is shown in FIGS. 7 and 8. This data clearly demonstrates that the methods and compositions of the present invention provide a vast improvement for the oxidation of contaminates compared to other conventional technologies, which take hours to oxidize much smaller amounts of contaminates. The inventors are not aware of any prior art references showing ozone/hydrogen peroxide treatment of above 100 mg/l contaminates.

Example 3

Computer Modeled Reactor Simulations of Ozone-Based Organic Oxidation

Having a high quality process model significantly reduces the number of experiments required to understand reactor performance, and greatly enhances the reliability of subsequent scaled-up designs. These simulations of the reactor system reduce the number of experimental runs needed to define the system, by better identifying the experimental space where data is needed. Computer runs are certainly less time consuming than hands-on experiments.

Basic computer modeling is developed for the ozone-only system, and then extending it to an ozone/peroxide combined system.

In this work, an early concern about the design was supplying enough oxidant to the reactor to treat a 1000 ppm organic stream. With ozone alone, it is a formidable task, and gas phase stripping of organics appeared unacceptably high. With the addition of a stoichiometrically similar amount of hydrogen peroxide (30% solution) plus ozone the total oxidant requirement looks more reasonable to completely degrade a contaminant in a waste fluid, such as acetone. Degradation means at least partial oxidation of the original compounds to partial oxidation products, but not necessarily complete destruction to carbon dioxide and water. The key question is how to effectively use the oxidants provided. In the ozone/hydrogen peroxide system several factors including pH, the presence of aqueous metals or salts, use of UV light, or solid phase catalyst are all very important in the oxidation efficiency.

The next step was development of a combined ozone/peroxide model. Due to the contradictory information in the literature about reaction rates (see for example: Mullins, M. E., "Aqueous Phase Oxidation of Contaminants," Presented at AIChE Summer Convention, Philadelphia, Pa. August 1989; Beltrain, F. J., G. Ovejeor, and J. Rivas, "Oxidation of Polynuclear Aromatic Hydrocarbons in Water. 4. Ozone Combined with Hydrogen Peroxide," Ind. Eng. Chem. Res., Vol. 35, pp 891-896 (1996); Kuo, C-H., and S. M. Chen, "Ozonation and Peroxone Oxidation of Toluene in Aqueous Solutions," Ind. Eng. Chem., Vol 35, pp 3973-3983 (1996); Beltrain, F. J., J. M. Encinar, and M. A. Alonso, "Nitroaromatic Hydrocarbon Ozonation in Water. 2. Combined Ozonation with Hydrogen Peroxide or UV Radiation," Ind. Eng. Chem. Res. Vol. 37, pp 32-40 (1998); Beltrain, F. J., J. Rivas, P. M. Alvarez, M. A. Alonso, and B. Acedo, "A Kinetic Model for Advanced Oxidation Processes of Aromatic Hydrocarbons in Water: Application to Phanthrene and Nitrobenzene," Ind. Eng. Chem. Res., Vol. 38, pp 4189-4199 (1999); Lang. S. et al., "Treatability of MTBE-contaminated groundwater by Ozone and Peroxone", Journal AWWA, June 2001; Beltrain, F. J., J. F. Garcia-Araya, V. Navarrete, and F. J. Rivas, "An Attempt to Model the Kinetics of the Ozonation of Simazine in Water," Ind. Eng. Chem. Res., Vol. 41 pp 1723-1732 (2002); Acero, J. F. J. Benitex, F. J. Real, and C. Maya, "Oxidation of Acetamide Herbicides in Natural Waters by Ozone and by the Combination of Ozone/Hydrogen Peroxide: Kinetic Study and Process Modeling," Ind. Eng. Chem. Res., Vol. 42, pp 5762-5769 (2003); a practical compromise was adopted in the model, in which two independent reaction terms were assumed: one for the ozone, and one for the peroxide with a pH dependency. It seems to fit the existing data well. Once again, this system seems to work better for the higher pH's (8-10), but has only small advantages for low pH's over ozone alone.

Model Development:

No quantitative information on pressurized ozone/peroxide reactors in the research literature or the patent literature was found, so there was no data available to determine the possible advantages or disadvantages of operating this system under pressure.

It would also be desirable to do sensitivity analyses to determine the most important variables to exploit (including pressure). However, no matter how cleverly a model is constructed, to have confidence in any actual design requires some experimental validation of the model results.

A Microsoft Word text version of the MathCAD 11 program is found below in the section titled: Packed-bed ozone reactor system model. This is not an executable file. There are 2 models for the ozone system: a segregated (plug) flow model and a dispersed flow model at atmospheric operation and two models at high pressure. Since we are envisioning a packed column system, the results are not substantially different between the two, but the dispersed flow model is slightly more accurate if we could experimentally determine what the dispersion coefficient might be for present reactors. Those experiments have not been done in present studies to date.

Using the model to examine the effect of pressurizing the reactor (in the range of 2 to 5 atmospheres), the results appear very promising. There is a strong positive effect of increased pressure in reducing reactor size, slightly improving mass transfer rates, and greatly reducing the contaminant stripping for the straight ozone in water case. Of course, increasing the pressure does not improve the oxidation stoichiometry, so a lot of ozone is still needed. However, pressurization does significantly help the problem of stripping of the organic at high concentrations.

Using the design objectives, and operating at higher pressures, the model shows that the number of plug-flow reactors in series can be reduced to 2 or 3. This is due to the enhanced reaction rate and because the mass transfer correlation predicts an increase of the mass transfer coefficient by a factor of 3. This means the overall size of the system is reduced by at least a factor of two.

The chemistry of advanced oxidation reactions can be quite complex; therefore, a fairly pragmatic approach has been assumed in that sufficient detail is used to accurately reflect the real chemistry, but there are not so many reaction variables that they cannot be obtained for a limited number of experimental studies. Second order kinetics has been assumed for the oxidation of the organic, with a variable stoichiometry for the ozone/organic. A detailed network of all the side oxidation reactions leading to complete and partial oxidation has not been incorporated at this point, as those sets of reaction parameters are very compound specific. For the ozone, all of the reactions leading to ozone destruction have been lumped into a pseudo-rate constant, w, the specific ozone utilization rate. Since the ozone is consumed by many pathways including reaction with the organic and its decomposition products, self-decomposition, and scavenging by minerals or ionic contaminants in the water, the reaction rate expressions quickly become difficult to interpret. From a practical point of view, the specific utilization rate is easy to determine from a simple batch test of ozone with the water to be treated; whereas, the myriad rate constants for the entire network of reactions is virtually impossible to decipher. In the past this has been a very successful method for determining the primary rate of contaminant destruction and the amount of ozone required. For pure water, the half-life of ozone is on the order of minutes, but even in tap water, the half-life may be cut in half. Any pH effects are also contained in the utilization rate for a specific water.

Several other important features of the computer simulation should be noted. These include:

The mass transfer coefficients for both the absorption of ozone, and the stripping of the organic.

Many of the variables in the model attached are values for toluene, but can be readily changed to other compounds of interest. These include the molecular weight, Henry's law constant, reaction rate constants, and oxidation stoichiometry.

The gas and liquid flowrates in the model attached are also somewhat arbitrary and can be scaled for any desired column diameter.

The model, as written, is for co-current flow, but can be adapted for counter-current flows of gas and liquid if desired.

It is important to note, that with good data from a bench scale system, the reaction and mass transfer parameters of the model can be "tuned" to much more accurate scale up of the reactors to larger flowrates. Without this "feedback" loop it would be somewhat difficult to build a pilot scale system based on the model alone.

After running numerous studies using this model, some general conclusions about the results may be made:

The simple pressure drop calculation included, shows a very small pressure drop across the column (only a few inches of water).

Properly balancing the ozone feed to the reactors will be extremely important for best efficiency.

Co-current feed of ozone and water is more efficient for any case.

In the case of volatile, sparingly soluble organic contaminants (e.g. toluene), stripping is a large factor in organic removal. Lowering the volumetric gas flowrate and increasing ozone concentration mitigates this to a great extent.

In the case of most, but not all, contaminants, the reaction is still largely mass transfer limited! Additional examination of factors to improve this may help decrease the reactor size even further.

For high concentrations of organic (>2000 ppmw), the column performance becomes limited by the volume of gas containing ozone required. In other words, if we were to try to oxidize all of the organics in one column, in the case of toluene we end up adding so much gas that stripping becomes by far the largest mechanism for removal of benzene! This is true even for high (8%) ozone concentrations. There may be other contacting patterns or reactor configurations that help prevent this problem (although counter-current flow makes it worse).

The initial runs of the model with ozone-peroxide kinetics show that the gas to liquid ratios are much more favorable, but chemical kinetics used in that model are needed. Additional experimental data on the ersatz organic/water systems are also needed to tune the model for proper hydrogen peroxide addition rates. The practicality of this design is the effective use of all of the added oxidants towards contaminant destruction.

Overall, the model results of the pressurized ozone/peroxide reactor are quite promising. The reaction rates, mass transfer rates, and magnitude of organic stripping all look very good. The level and size of suspended solids should not be a problem. Even the pH of the sample water is in a great range to enhance reaction rate. A major concern is still the high TOC level (up to 2000 ppmw) for the industrial waters of interest. Not only does that mean using large volumetric flowrates of ozone, but for the highest concentrations enough ozone to completely oxidize the sample is supplied, there is enough oxidation taking place to heat the water by 7 to 10 degrees C.

Plug-Flow Ozone Reactor System Model

The following description provides multi-phase, multi-component reactor models for 3 different cases: segregated (plug) flow, staged mixed reactors, and disperse flow (both initial and boundary value solutions). A hydraulic model with a single phase Ergun pressure drop calculation, and both co-current and counter current solutions are also included. Reactor material balances are performed for each of the reactants (i.e. ozone and the organic) in both the liquid and gas phases Ergun equation: The standard Ergun equation is usually applied to the flow of a single phase fluid, either a liquid or a gas, through a porous medium. In the operation of a two-phase reactor, a liquid may flow co-currently or counter current to the liquid flow through the packing material. The presence of the liquid reduces the void fraction and increases the gas phase pressure drop. As the gas rate is increased, the shear forces at the gas-liquid interface tend to retard the flow of liquid, further decreasing the void fraction. If the gas rate is increased sufficiently, a point will be reached where the liquid is retarded to a degree that it totally fills the packing material at some point in the tower. This condition is known as flooding. Pressure-flow relationships for two-phase flow in packed reactors are complex and semi-empirical correlations must be used. The following form of the Ergun equation may be used for a single continuous phase.

Ergun equation to calculate the pressure drop (DP) for a given flowrate, where L is the flow path (bed) length, m is the fluid viscosity, r is the fluid density, e is the void fraction, F is the particle sphericity (1.0 for spheres), Dp is the particle diameter, and V is the mean fluid velocity.

$$V := 0.1 \frac{m}{s}$$
$$\mu := 0.1 \; cP$$
$$\rho := 1000 \; \frac{kg}{m^3}$$
$$L := 1 \; m$$
$$D_p := 0.03 \; m$$
$$\varepsilon := 0.39 \; \text{unitless}$$
$$\Phi := 1 \; \text{unitless}$$

The pressure drop across the bed is:

$$\Delta P(V) := L \frac{150 \cdot V \cdot \frac{\mu}{1000}}{\Phi^2 \cdot D_p^2} \cdot \frac{(1-e)^2}{e^3} + \frac{1.75 \cdot \rho \cdot V^2}{\Phi \cdot D_p} \cdot \left(\frac{1-e}{e^3}\right) Pa$$

$$\Delta P(V) = 6.009 \times 10^3 \; Pa$$

$$\text{Or: } \Delta p := \frac{\Delta P(V)}{1.013 \cdot 10^5} \cdot 14.690 \; psia$$

$$\Delta p = 0.872 \; psia$$

Segregated flow reactor model: In a two-phase reactor, disperse flow takes on new meaning, in that one phase may be close to plug flow (e.g.—bubbles in a bubble column, or droplets in a spray column); whereas the other phase (typically the continuous phase) may be affected by some degree of mixedness. In some cases the continuous phase may also be considered segregated, as when the reactor length is very large as compared to its width, or when packing is used. In these simplified two-phase reactions, a continuous flow reactor may be adequately modeled using a segregated flow model for each phase. This produces a set of first-order ordinary differential equations that are readily solved for any order reaction as an initial value problem. The example below is for an ozonation reactor with a water-phase reactant in a simple 2nd order reaction for either the co-current or counter current situation. The oxidation occurs solely in the liquid phase; however, stripping of the organic into the gas phase is accounted for.

The pertinent differential equations for ozone oxidation of an aqueous organic, S, are:

Gas phase ozone: $\quad \frac{d}{dt} O_{3g} := k_{LaO3} \cdot (O_{3L} - O_{3e}) \cdot \frac{Q_L}{Q_G}$ Liquid phase ozone: $\quad \frac{d}{dt} O_{3L} := k_{LaO3} \cdot (O_{3e} - O_{3L}) - h_1 \cdot w \cdot O_{3I}$ Gas phase organic: $\quad \frac{d}{dt} S_g := k_{LaS} \cdot (S_L - S_e) \cdot \frac{Q_L}{Q_G}$ -continued Liquid phase organic: $\frac{d}{dt}S_L := k_{LaS} \cdot (S_e - S_L) - h_1 \cdot k \cdot O_{3L} \cdot S_L$

| | | | |
|---|---|---|---|
| Specific ozone utilization rate (sec-1): | $w := .05$ | Liquid holdup: | $h_l := .91$ |
| Organic oxidation rate (gmol/sec) | $k := 300$ | Henry's law constant organic: | $h_s := .42$ |
| Henry's law constant, O3: | $h := 2.8$ | Organic/ozone stoichiometry | $\omega := 1$ |
| Volumetric flowrates (L/sec) | $Q_G := .5$ $Q_L := 1$ | Column cross sectional area (m2) | $A_c := .3$ |
| Residence time range (seconds): | $t0 := 0$ | $t1 := 50$ | $MW_R := 80$ |

We can use a gas-to-liquid mass transfer correlation we have developed for 2-phase co-current flow in a packed bed reactor to obtain an estimate of the mass transfer coefficient, Kla. (Kindt, 1996) (sec-1)

Linear mass flowrates, $G_L$ and $G_g$, (kg/m²-s)

$$G_L := \frac{Q_L}{1000 \, A_c \cdot \varepsilon} \qquad G_g := \frac{Q_G}{1.2 \cdot A_c \cdot \varepsilon}$$

$k_{LaO3} := 0.06371 G_L^{0.3014} \cdot G_g^{0.4484}$ $k_{LaS} := \frac{48}{MW_R} \cdot k_{LaO3}$ $k_{LaO3} = 0.027$     $k_{LaS} = 0.016$ Initial concentrations (gmol/L)

$$\lambda := \begin{pmatrix} 0.0 \\ 0.00333 \\ .00379 \\ 0 \end{pmatrix} \begin{array}{l} \text{Liquid phase ozone} \\ \text{Gas phase ozone} \\ \text{Liquid phase organic} \\ \text{Gas phase organic} \end{array}$$

Set up equation matrix for each material balance:

$$D(t, \lambda) := \begin{bmatrix} k_{LaO3} \cdot \left(\frac{\lambda_1}{H} - \lambda_0\right) - h_1 \cdot w \cdot \lambda_0 \\ k_{LaO3} \cdot \left(\lambda_0 - \frac{\lambda_1}{H}\right) \cdot \frac{Q_L}{Q_G} \\ \left[k_{LaS} \cdot \left(\frac{\lambda_3}{h_s} - \lambda_2\right) - h_1 \cdot k \cdot \lambda_2 \cdot \lambda_1\right] \\ k_{LaS} \cdot \left(\lambda_2 - \frac{\lambda_3}{h_s}\right) \cdot \frac{Q_L}{Q_G} \end{bmatrix} \begin{array}{l} \text{Liquid phase ozone} \\ \text{Gas phase ozone} \\ \text{Liquid phase organic} \\ \text{Gas phase organic} \end{array}$$

Set up solution matrix, Z:     $Z := Rkadapt(\lambda, t0, t1, 1000, D)$ $t := Z^{(0)}$    $C_{O3L} := Z^{(1)}$    $C_{SL} := Z^{(3)}$    $C_{S_g} := Z^{(4)}$    $C_{O3g} := Z^{(2)}$ Dispersed flow reactor model: If some mixing occurs within the reactor, especially due to the two phase passing through the packing at different rates, or due to turbulence within the column, then the plug-flow assumptions do not strictly apply. The chief parameter defining whether this is important is the Peclet number: Pe=Lv/Da. Here L is the bed length, v is the linear fluid velocity, and Da is the dispersion coefficient. The set of resulting equations are no longer a simple set of first order initial values equations, but a set of second order equations that must be solved via a boundary value solution.

Sample Data:

| | | | |
|---|---|---|---|
| Dispersion Coefficient (unitless) | $D_a := 10$ | Volumetric gas and liquid flowrates: (L/min) | $V_g := 1$ $V_L := 1$ |
| Interfacial transfer area (m²/m³) | $A := 1$ | | |

The basic differential equations representing the mass balances for dispersed flow with one gas phase (O) and one liquid phase (C) reactant over a bed length from z=0 to z=L are:

Gas phase reactant mass balance equation $$D_a \cdot A \cdot \frac{d^2}{dz^2} C_{OL}(z) - V_L \cdot \left(\left(\frac{d}{dz} C_{OL}(z)\right)\right) + k_{LaO} \cdot A \cdot \left(\frac{C_{Og}(z)}{H} - C_{OL}(z)\right) = k_1 \cdot C_{OL}(z)$$

Liquid phase reactant mass balance equation $$D_a \cdot A \cdot \frac{d^2}{dz^2} C_{CL}(z) - V_L \cdot \left(\left(\frac{d}{dz} C_{CL}(z)\right)\right) - k_{LaOC} \cdot A \cdot \left(C_{CL}(z) - \frac{C_{Cg}(z)}{h_s}\right) = h_1 \cdot k_1 \cdot C_{CL}(z) \cdot C_{OL}(z)$$

With the Danckwert's boundary conditions:

$$(C_{O3g}(z) = C_{O3f}(z))$$

$$-D_a \cdot A \cdot \frac{d}{dz} C_{O3L}(z) = V_L \cdot (C_{O3f}(z) - C_{O3L}(z))$$

$$-D_a \cdot A \cdot \frac{d}{dz} C_{OCL}(z) = V_L \cdot (C_{OCf}(z) - C_{OCL}(z))$$

-continued $$\frac{d}{dz}C_{O3L}(z) = 0$$

$$\frac{d}{dz}C_{OCL}(z) = 0$$

Since these are second order differential equations, with 2 unknown boundary conditions, a "shooting" method is used to turn this into an intial value problem. (details of the Math-CAD code are below).

Shooting Method to find B.C.s:

Mass transfer coefficents $k_{LaO}: = 0.02 \quad k_{LaC}: = .03$

Interfacial area $A: = 1$

Guess $v: = \begin{pmatrix} 0.003 \\ .0001 \end{pmatrix}$

Liquid holdup $h_1: = .8 \quad h_g: = 1$ $$\text{load}(z1, v): = \begin{pmatrix} 0 \\ 0 \\ 0.000333 \\ 0 \\ v_0 \\ v_1 \end{pmatrix}$$

$$D(z, \xi): = \begin{bmatrix} \xi_0 \\ \xi_1 \\ k_{LaC} \cdot A \cdot \left(\xi_4 - \frac{\xi_3}{h_s}\right) \cdot \frac{1}{V_g} \\ \left[k_{LaO} \cdot A \cdot \left(\frac{\xi_2}{h} - \xi_5\right)\right] \cdot \frac{1}{V_g} \\ \frac{V_L \cdot \xi_0 + k_{LaO} \cdot A \cdot \left(\frac{\xi_2}{h} - \xi_5\right) - h_1 \cdot \xi_5}{D_a \cdot A} \\ \frac{V_L \cdot \xi_1 - k_{LaC}\left(\xi_4 - \frac{\xi_3}{h_s}\right) - h_1 \cdot k \cdot \xi_4 \cdot \xi_5}{D_a \cdot A} \end{bmatrix}$$

$$\text{score}(z2, \xi): = \begin{pmatrix} \xi_4 - .00001 \\ \xi_5 - .00001 \end{pmatrix}$$

$S: = sbval(v, 0, 20, D, \text{load}, \text{score})$

We now have our missing initial conditions! $S = \begin{pmatrix} 2.092 \times 10^{-5} \\ 9.682 \times 10^{-6} \end{pmatrix}$ The system of equations now may be solved as an initial value problem. Convert the second order equations into a set of first order equations by defining the first derivatives of liquid phase concentrations for reactor size, z, as shown in the first 2 equations below. The entire set of equations along with any algebraic constraints and the initial values are also provided:

TsO he so

Given $$\frac{d}{dz}C_{O3L}(z) = \chi(z)$$

$$\frac{d}{dz}C_{RL}(z) = \phi(z)$$

$$V_g \cdot \frac{d}{dz}C_{RL}(z) = k_{LaR} \cdot A \cdot \left(C_{RL}(z) - \frac{C_{Rg}(z)}{h_s}\right)$$

$$\left[V_g \cdot \frac{d}{dz}C_{O3g}(z) + k_{LaO3} \cdot A \cdot \left(\frac{C_{O3g}(z)}{h} - C_{O3L}(z)\right)\right] = 0$$

$$D_a \cdot A \cdot \frac{d}{dz}\chi(z) - V_L \cdot \chi(z) + k_{LaO3} \cdot A \cdot \left(\frac{C_{O3g}(z)}{h} - C_{O3L}(z)\right) =$$

$$h_1 \cdot w \cdot C_{O3L}(z)$$

$$D_a \cdot A \cdot \frac{d}{dz}\phi(z) - V_L \cdot \phi(z) - k_{LaR} \cdot \left(C_{RL}(z) - \frac{C_{Rg}(z)}{h_s}\right) -$$

$$h_1 \cdot k \cdot C_{RL}(z) \cdot C_{O3L}(z) = 0$$

$C_{O3L}(0) = 2.092 \times 10^{-5}$ $C_{RL}(0) = .00008$ $C_{O3g}(0) = .000333$ $C_{Rg}(0) = 9.682 \times 10^{-6}$ $\chi(0) = 0.0000:$ $\phi(0) = 0.0000:$ A pilot scale packed bed ozone and hydrogen peroxide based reactor was designed to run a basic experimental matrix on several compounds of interest. The design was prepared to validate the parameters used in the present model. Of particular importance were mass transfer rates and destruction rates. The present apparatus was originally designed to operate at near atmospheric pressure, but was subsequently modified to operate up to about 40 psia. In this fashion, a clearer idea of how operating under elevated pressure will work for ozone alone and for the ozone and hydrogen peroxide system is obtained.

Experimental Studies and Set-Up

A pilot scale packed ozone/hydrogen peroxide reactor (one) was used to analyze the basic experimental matrix on the compounds of interest, to validate the parameters used in the model and to help refine the design of systems of the present invention. The original device used to test was designed to operate at about 40 psia.

A one reactor system was developed to provide data useful in the modeling process. The setup was designed to support a glass column reactor. An inlet source tank was prepared with 40 liters of distilled water plus chemicals common in industrial waste fluid, such as toluene, acetone, acetonitrile, and phenol. The solution was allowed to equilibrate for 24 hours with constant stirring. The waste fluid was then pumped through a variable speed gear pump and liquid rotometer into the bottom end of the reactor column.

Bottled oxygen with a double-sided regulator was used to supply gas to the ozone generator and reactor at sufficient pressure. The oxygen traveled directly to the OREC Ozone Generator which requires cooling by a circulating water system next to the source tank. According to calibration test performed with indigo dye, the gas leaving the ozone generator at the settings employed was approximately 4% ozone and 96% oxygen. The gas was diffused into the bottom of the reactor.

The reactor itself consists of a two foot long×four inch I.D. Pyrex glass column with cast iron flanges and steel end plates. The bottom four inches contain a porous ceramic diffuser device for the gas inlet as well as the stand and a screen to support the packing. The next twenty inches were filled with ½ inch glass Raschig ring type random packing which serves to enhance mass transfer and prevent back-mixing with the reactor.

Gas and liquid exit the reactor through a single outlet, which was equipped with a pressure gauge, pressure regulator, and ball valve. Pressure gauges were also placed on both gas and liquid inlet line and another back pressure regulator was included downstream of the regulator. The ball valve was used to pressurize the reactor during the experiment by restricting exit stream. This resulted in a higher velocity in the gas/liquid stream as it escaped, but still left the problem of separating the off-gas from the treated water. As such, a flash chamber operatively attached to the treated waste fluid stream.

Experimental Procedure:

Several experiments were conducted with the pilot plant to determine the effect of a number of variables on the destruction of the chemicals mentioned above. The three most important variables (flowrates, ozone concentration and pressure) were tested and shown in Table 4:

TABLE 4

Experimental Setup
Testing Rubric For Waste Fluid Treatment By Ozone

|  | Trial 1 | Trial 2 | Trial 3 | Trial 4 | Trial 5 | Trial 6 | Trial 7 | Trial 8 |
|---|---|---|---|---|---|---|---|---|
| Pressure (psig) | 0 | 0 | 0 | 0 | 15 | 15 | 15 | 15 |
| $O_3$ Amps (A) | 1.00 | 1.00 | 2.00 | 2.00 | 1.00 | 1.00 | 2.00 | 2.00 |
| Liquid Flow (L/min) | 0.6 | 1.6 | 0.6 | 1.6 | 0.6 | 1.6 | 0.6 | 1.6 |
| Gas Flow (L/min) | 10.0 | 10.0 | 10.0 | 10.0 | 10.0 | 10.0 | 10.0 | 10.0 |

The eight trial ensured that samples were taken at each combination of two different pressures, two different amperages (ozone concentrations), and two different liquid flow rates. The gas volumetric flowrate was held constant for all tests.

The critical variable to be tested was the pressure in the reactor, followed by the liquid flowrate and the ozone generator amperage. Over the complete range of testing, it proved difficult to operate at constant pressures of 15 psig, however, all tests can be considered accurate within the range of 15±2 psig. Although gas flow could also have been included as a variable for these tests, the benefit would have been minimal in the face of doubling the number of trials.

The rubric of Table 4 was first used to evaluate the destruction of waste fluid having organics acetone and toluene. Four milliliters of each chemical was added to 40 liters of distilled water, resulting in 87 ppm toluene and 79 ppm acetone by mass, or simply 100 ppm each by volume. Samples of the solution were taken so that concentrations could be determined analytically instead of relying on complete dissolution and mixing. The samples were collected in 40 ml vials and 100 ml jars to be tested respectively for aromatics, i.e., toluene and phenol, volatiles, i.e., acetonitrile and acetone, and Total Organic Carbon (TOC).

The rubric of Table 4 was also used to test the pilot plant, this time with a combined ersatz solution of acetonitrile, phenol, toluene, and acetone. Concentrations in this solution were 157 ppm acetonitrile, 107 ppm phenol, 109 ppm toluene, and 99 ppm acetone. Again, initial samples were taken for analysis, and exit samples were collected for each trial in succession. With the solution remaining after these tests, another test was introduced to determine the effect of hydrogen peroxide in solution and the peroxone reaction. A 30% hydrogen peroxide solution was used to add 10 ml per liter of the remaining simulated waste fluid. The result was a solution of about 3.3% hydrogen peroxide and the other chemicals in their lower concentrations. Trials three and seven were chosen as representative data points and sampling was performed at those conditions. With sampling completed, the vials and jars were tested for TOC, volatiles and BTEX analysis. To verify these results, several duplicate samples were taken of trials four and seven during the testing, and these samples were sent out for independent analysis (White Water Associate, Inc., Amasa, Mich.).

Representative results for the removal of toluene are shown in Table 5 below. Note that these results don't represent the complete destruction of toluene to carbon dioxide and water, rather they show a combination of the destruction, degradation to other compounds, plus stripping which may occur. In any case, the removal numbers are impressive for such a small column and short contact times.

TABLE 5

Representative Toluene Removal

| Trial | EPA Method 8260B | Concentration | Toluene Reduction (%) |
|---|---|---|---|
| Initial | Toluene | 12,500 µg/L | NA |
| Exit Run 2, Trial 3 | Toluene | 1,650 µg/L | 86.8 |
| Exit Run 1, Trial 4 | Toluene | 5,030 µg/L | 59.76 |
| Exit Run 1, Trial 7 | Toluene | 2,360 µg/L | 81.12 |
| Exit Run 2, Trial 7 | Toluene | 1,590 µg/L | 87.28 |

The results from trials 3 and 7 show removal of 80% to 90% of the toluene, as might be expected for these higher ozone concentrations and lower liquid flowrates (higher residence times). Although it would be useful to get a better handle on the total removed via stripping, it is instructive to compare these percentages to the TOC removal numbers to understand the relative amount of materials that must be at least partially oxidized.

The results of the TOC trials are shown below in Table 6. The original ersatz mixture of the four chemicals had a measured TOC of 288 ppm. This may differ from the theoretical TOC based upon the original mixture as made due to evaporation, etc. Note that although, the original organic compounds may have been up to 80% degraded, the TOC is more slowly reduced due to the formation of partial oxidation byproducts. Although, some of the reduction may be due to stripping, the reductions are significant for such a small reactor and contact time.

TABLE 6

TOC

| Sample I.D. | TOC, ppm | TOC, removal (%) |
|---|---|---|
| Initial | 288 | NA |
| exit setting 1 | 279 | 3.13 |
| exit setting 2 | 265 | 7.99 |
| exit setting 3 | 275 | 4.51 |
| exit setting 4 | 258 | 10.42 |
| exit setting 5 | 282 | 5.21 |
| exit setting 6 | 272 | 5.56 |
| exit setting 7 | 265 | 7.99 |

TABLE 6-continued

| | TOC | |
|---|---|---|
| Sample I.D. | TOC, ppm | TOC, removal (%) |
| exit setting 8 | 272 | 5.56 |
| Initial with $H_2O_2$ | 297 | NA |
| settings 3 with $H_2O_2$ | 262 | 11.78 |
| setting 7 with $H_2O_2$ | 272 | 8.42 |
| Blank | 4.7 | NA |

It is apparent that there is a large discrepancy between the toluene removal (>80%) and total TOC removal (approximately 10%). It is believed that these results indicate that stripping of the organic is present, but small, and that the majority of the original compounds are being at least partially oxidized. These experimental values cannot be strictly quantitatively interpreted unless precisely the identity of the partial oxidation byproducts is known.

A few points are apparent from this data: First, generally the presence of hydrogen peroxide is useful in the destruction of organics. Second, higher ozone concentrations in the influent are very beneficial. Third, somewhat surprisingly, the effect of liquid flowrate (i.e., contact time) is not particularly important, however, this may be due to the complete depletion of ozone in the reactor over an even shorter timeframe. Finally, from these results, one may gather that pressure is important and will also result in the reduction of stripping of organics at higher pressures. So overall, the actual destruction of the organics is probably higher overall. The model developed earlier should be able to help on the analysis of this data, as discussed more completely below.

Results:
Fitting the Model to the Experimental Results:

The segregated flow model of the present invention is a reasonable representation of the co-current, plug flow system envisioned. Several aspects of the reaction parameters are under investigation: reaction parameters associated with the mass transfer coefficients (kLa's), specific ozone utilization rate (w) and specific reaction rates (k). It is believed that discussions that follow provide an accuracy of about ±20%.

Indigo dye fading studies to determine ozone mass transfer coefficients: Indigo dye reacts stoichiometrically with ozone to go from a dark blue to colorless in an extremely fast reaction. Indigo is also a non-volatile solute, so that the reaction is ideal for determining the rate of ozone mass transfer and for titrating the amount of ozone being produced. Several flowrates of ozone containing gas for a given flowrate and concentration of indigo in waster were run, the results were used to "back calculate" the mass transfer coefficients by adjusting that parameter in the model to match the observed indigo outlet concentration.

Figure 9:
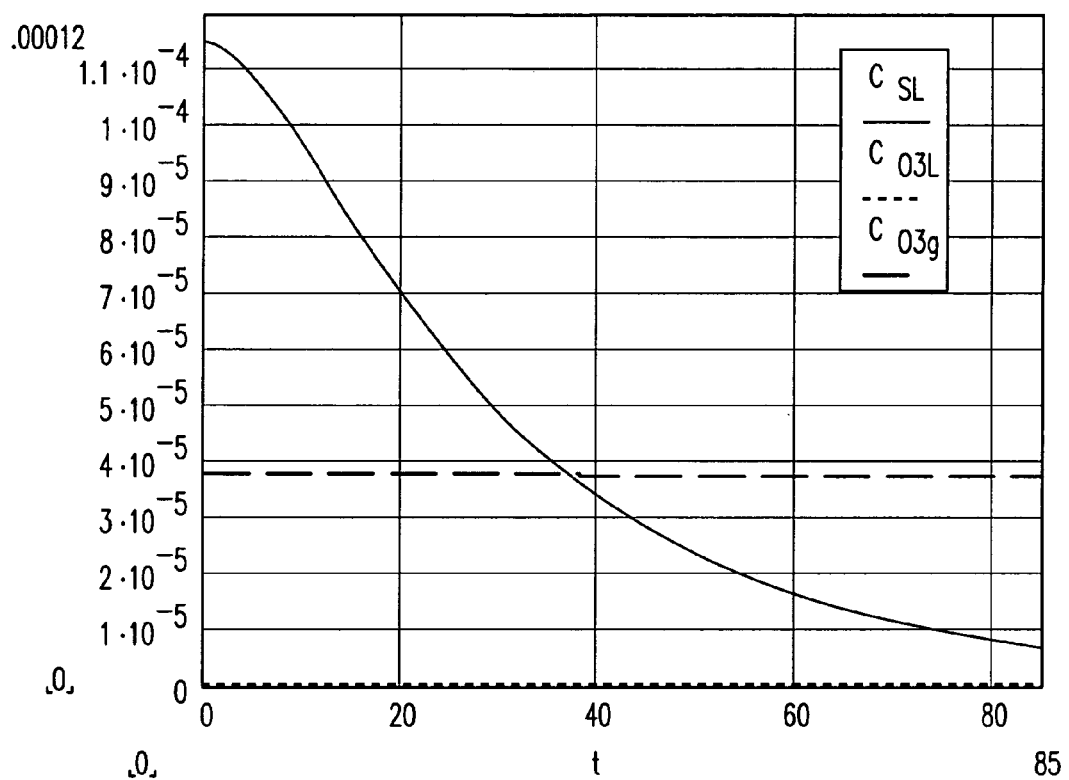
FIG. 9 is an illustrative plot of indigo dye concentration as a function of residence time in a reactor or reactor column in accordance with the present invention. For a residence time of 85 seconds, the mass transfer coefficient was adjusted to match the observed outlet concentration of indigo. Concentration (gmol/l) vs time (sec.). $C_{SL}$—liquid phase indigo, $C_{O3L}$—Liquid phase ozone, $C_{O3g}$—Gas phase ozone.

An example of a plot of concentration versus reactor contact time for the indigo-ozone system is shown in FIG. 9. This fitting exercise confirmed that the mass transfer correlation used is close to the results of the actual experimental value for ozone, the model is designed to be a conservative approach to this value. This data provides confidence in the predictions of the overall model. Also, by observing the passage of the blue indigo dye through the packed column reactor (see FIG. 10), the mean residence time of the water in the bed could be determined. For the data shown herein, at a flowrate of 3 L/min, the residence time was approximately 85 seconds.

Batch Tests For Determining the Specific Ozone Utilization Rate

In the following tests, a small closed flask containing ersatz water with the target contaminates (or the actual waste water to be treated) is saturated with ozone using a bubble diffuser. The gaseous ozone is then turned off and the flask sealed. The liquid phase ozone concentration is then monitored as a function of time using UV spectroscopy (or colorimetric techniques). The resulting data is analyzed as a pseudo first-order reaction, i.e., the log of the normalized concentration is plotted as a function of time. The slope of the plot is determined via a simple linear regression and the slope is equal to the specific ozone utilization rate.

This batch test is performed, for purposes of this Example, on any candidate aqueous waste stream to find the correct reactor residence times, ozone requirements, and flowrates. This rate constant incorporates both ozone decomposition, reaction with the target contaminates and the effects of pH and ionic strength. Although this approach limits the precision model, it is an excellent compromise between model complexity, the number of required parameters, and reliability of the model results. Even distilled water has an ozone utilization rate of approximately 0.05 sec-1, indicating an ozone half-life of only seconds to up to three minutes. For waste fluids, the values may be as high as 2.0 sec-1, indicating a half-life of only a few seconds. These rates are greatly affected by the presence of iron, metals, and particulate matter. For the ersatz waters, the values range from approximately 0.1 to 0.5 sec-1, but these are likely to be far higher for actual industrial waters.

Pilot Scale Ozonation of Ersatz Waters

Ersatz solutions were created, having target contaminates, by addition of small amounts of the pure chemicals to 40 liters of distilled water. The compounds selected include acetone, phenol, acetonitrile, and toluene. The entire experimental matrix is shown above in Table 1.

Samples were measured for each specific compound, and for Total Organic Carbon (TOC), before and after treatment. Representative results are shown in Tables 2 and 3. Using these exit concentrations of each component, adjustments were made to the reaction rate constants in the model to match what was observed. In this fashion, it was determined that a second order reaction rate constant for the oxidation of toluene is 147 M-1 sec-1, and that the specific ozone utilization rate constant (w) is approximately 0.15 sec-1. Similarly, the rate constants for phenol, acetonitrile, and acetone were fitted to exit data, and values between 75 and 500 M-1 sec-1 were obtained.

The results for phenol are interesting in that upon oxidation, the solution turned light brown, indicating that the phenol may have been polymerizing or undergoing some similar reaction. This of course removes the original phenol, but likely does not significantly reduce the TOC.

Figure 12:
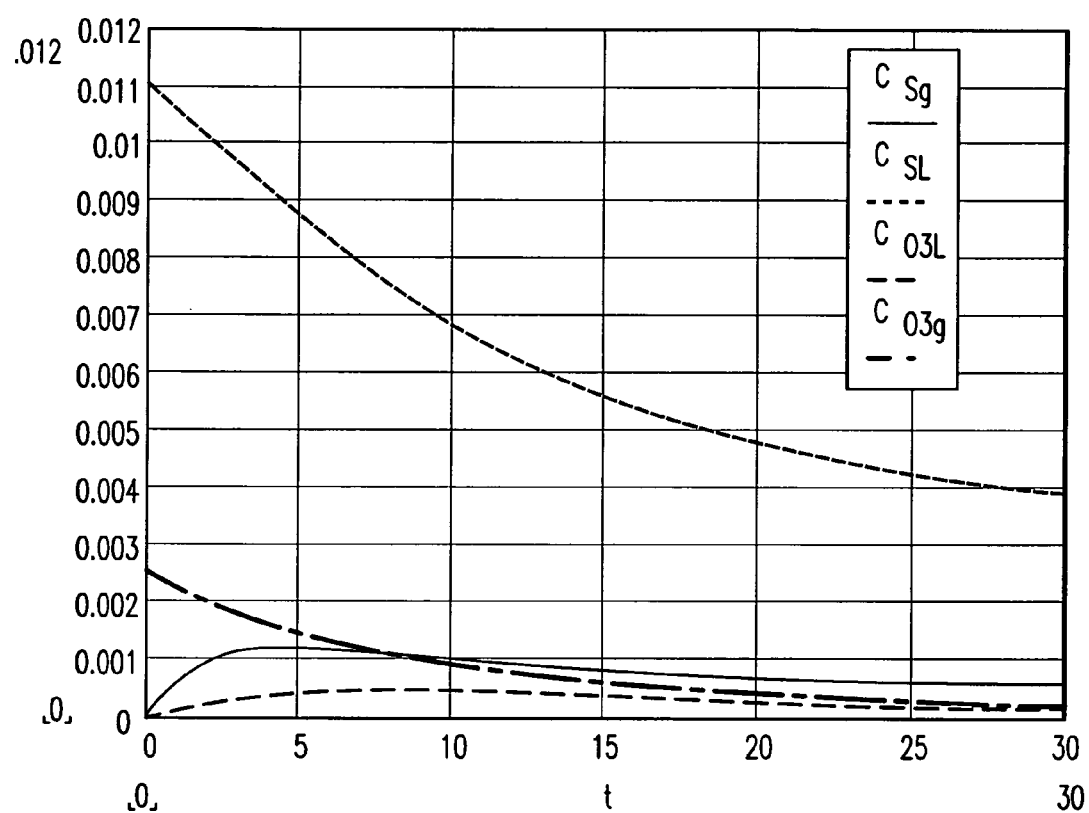
FIG. 12 is an illustrative plot of pressurized ozonation system (4% feed at 3 atm) in accordance with the present invention. Concentration (gmol/l) vs time (sec.). $C_{Sg}$—gas phase organic, $C_{SL}$—liquid phase organic, $C_{O3L}$—Liquid phase ozone, $C_{O3g}$—Gas phase ozone.
Figure 13:
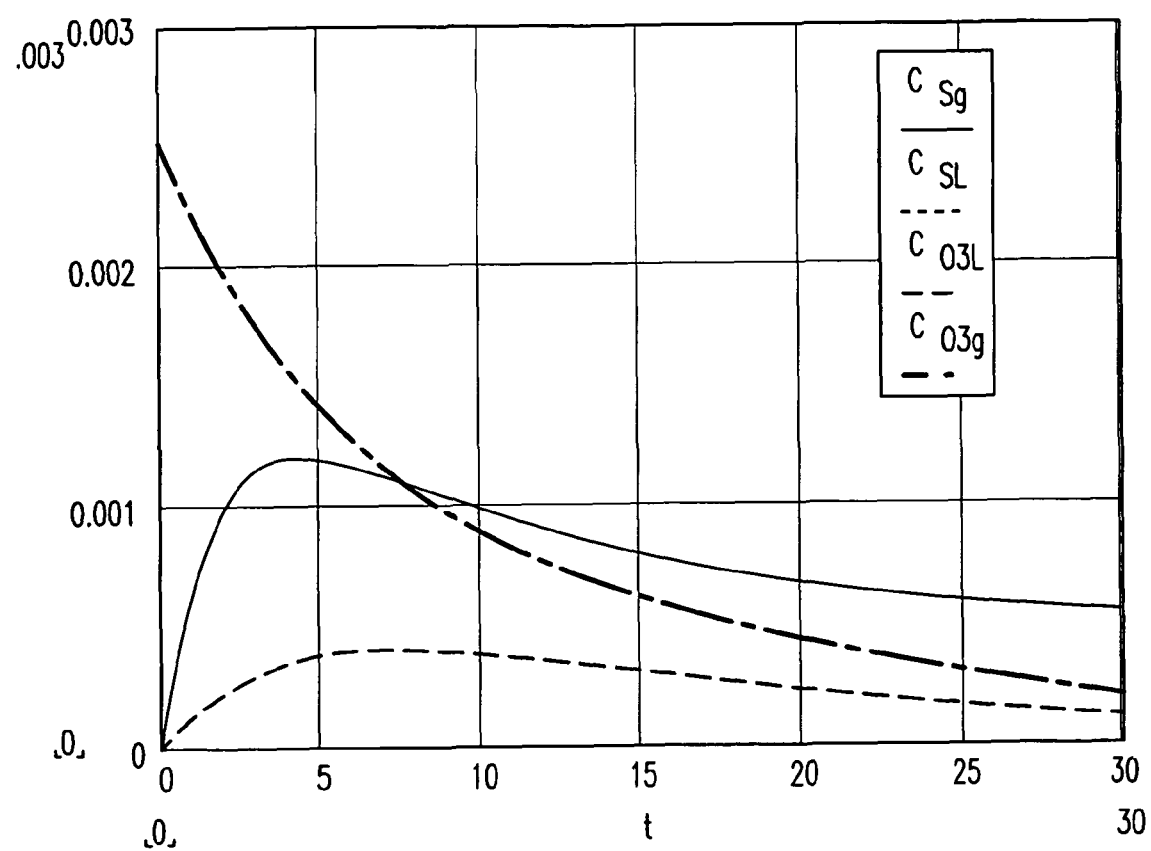
FIG. 13 is an illustrative plot detailing pressurized ozonation system (4% feed at 3 atm) in accordance with the present invention. Concentration (gmol/l) vs time (sec). $C_{Sg}$—gas phase organic, $C_{SL}$—liquid phase organic, $C_{O3L}$—Liquid phase ozone, $C_{O3g}$—Gas phase ozone.
Figure 14:
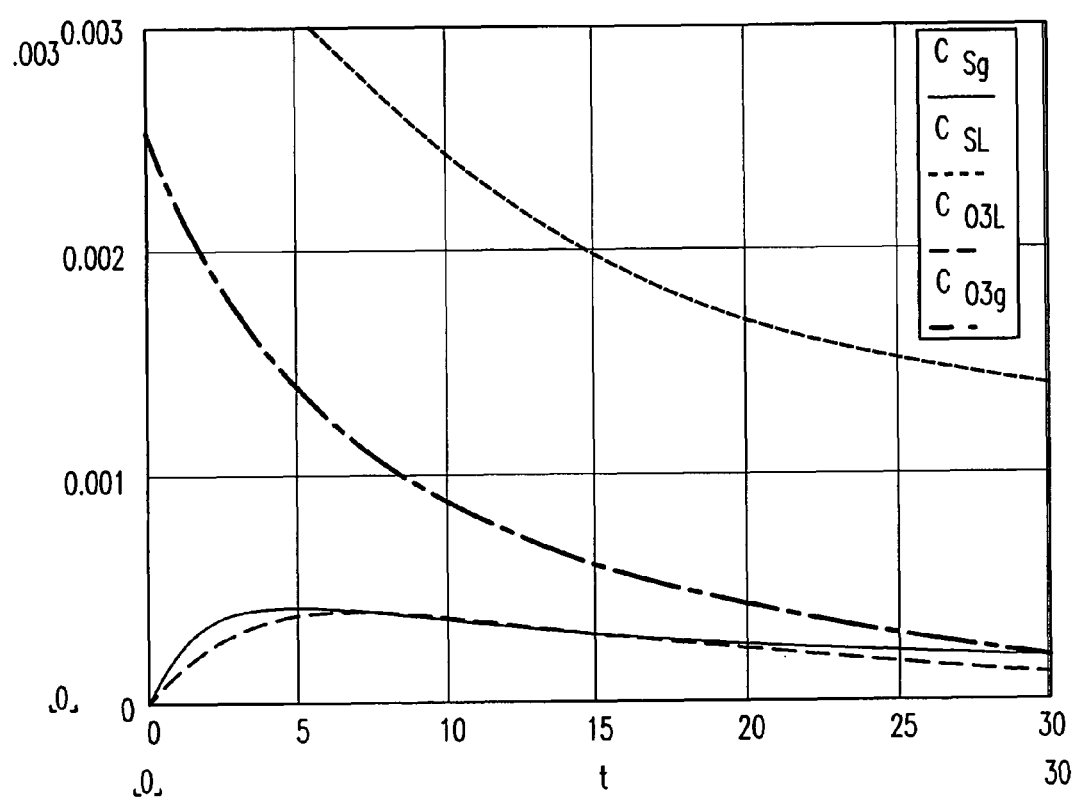
FIG. 14 is an illustrative plot detailing a concentration profile from a second reactor in series for the pressurized ozonation system (4% feed at 3 atm) in accordance with the present invention. Concentration (gmol/l) vs. time (sec). $C_{Sg}$—gas phase organic, $C_{SL}$—liquid phase organic, $C_{O3L}$—liquid phase ozone, $C_{O3g}$—Gas phase ozone.
Figure 15:
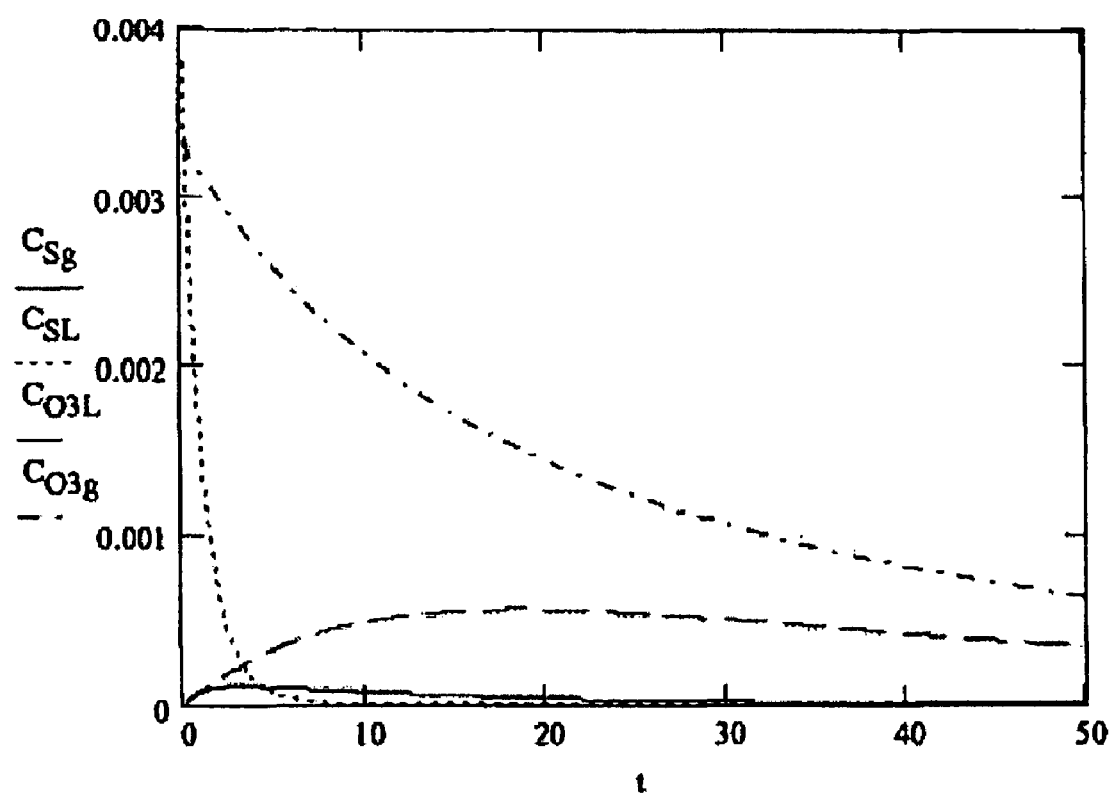
FIG. 15 is an illustrative plot detailing a segregated flow reactor model. Concentration (gmol/l) vs. time (sec). $C_{Sg}$—gas phase organic, $C_{SL}$—liquid phase organic, $C_{O3L}$—Liquid phase ozone, $C_{O3g}$—Gas phase ozone.

Several major observations can be made from these results, including that ozone is depleted far before the organic, due to higher reactivity of ozone. Therefore, in some cases, the ozone is effectively depleted within the first 30 seconds of contact time. This is more clearly evident for the pressurized reactor case (FIGS. 12 and 13). Another observation is that in the pressurized case, the stripping of organics is suppressed. Finally, since the ozone is depleted very rapidly, it is virtually impossible to lower the toluene concentration more than 70% at best in one column, but that subsequent columns (2 and 3) are needed to accomplish the original design objectives.

The above results are very instructive. Due to the lifetime of ozone in water, the maximum destruction that can be anticipated in a single stage reactor is about 70%, if followed in series by a second similar stage, 96%, and with a third stage in series, 99%. Notice that even after 30 seconds of contact time, the ozone is nearly depleted, and the organic destruction levels off. Once this has occurred, the remaining oxygen in the gas phase merely serves to strip the volatile organics up to their Henry's law limit. It is believed this is also why the water flowrates had little impact on the observed destruction; the ozone was too readily depleted. This depletion severely limits the maximum size of each individual reactor column, and means that fresh ozone feed is required at the entrance to each column. It is not recommended that ozone be added midway through the individual reactors due to excess stripping potential. Based upon the destruction obtained in each column, it takes at least 3 column runs to obtain complete degradation of the organics (based on type and level of contaminate). Under less ideal condition than a distilled water ersatz solution, it may take an additional column of two. The reduction in TOC at this point will probably not be 99+%, but on the order of 30 to 60%. To obtain further total TOC reduction (i.e., 99+%) would require at least two more columns in series, and the associated increase in ozone and hydrogen peroxide usage.

Conceptual Design:

A conceptual design was developed by applying an approach that was used for an advanced oxidation treatment system for contaminated waste fluid. A conception design of this system is provided in FIGS. 5 and 6. Note that the systems shown in FIGS. 5 and 6 could be designed at two systems in parallel and thereby provide for higher target flowrates. Addition of approximately 10 ml of $H_2O_2$ (30%) per liter of water to be treated lowers the TOC by approximately another 20%. It is particularly useful for some types of polar compounds.

The foregoing description of the invention is thus illustrative and explanatory, and various changes in the equipment, as well as in the details of the methods and techniques disclosed herein may be made without departing from the spirit and scope of the invention, which is defined by the claims.

This specification contains numerous citations to patents, patent applications and publications. Each is hereby incorporated by reference for all purposes.

What is claimed is:

1. A method for treating waste fluid while suppressing stripping of organics and enhancing gas-liquid ozone mass transfer rate comprising:
    continuously supplying ozone gas, hydrogen peroxide and an effective amount of caustic if needed to adjust the pH with a flow of waste fluid proximate to a bottom end of a substantially vertical substantially tubular reactor having a chamber with a packed bed comprising a series of surfaces;
    reacting the ozone, hydrogen peroxide and the effective amount of caustic co-currently with the flow of waste fluid in the reactor without substantial back mixing thereof, said co-current flow of ozone, peroxide, caustic and waste fluid being substantially non-turbulent substantially plug flow through the tubular reactor and packed bed, thereby producing an oxidized flow;
    maintaining a pH from about 7 to about 11 for the fluid being treated, an effective pressure, and an ozone mass transfer coefficient between about 0.01 and about 2 $sec^{-1}$ which complements an effective life of the ozone; and
    continuously withdrawing the oxidized flow from a top end of the tubular reactor.

2. The method according to claim 1, wherein the co-current flow being substantially laminar.

3. A method for treating waste fluid while suppressing stripping of organics and enhancing gas-liquid ozone mass transfer rate comprising:
    continuously feeding under pressure a co-current flow of an effective amount of ozone, hydrogen peroxide and caustic with waste fluid into a bottom end of a substantially vertical substantially tubular reactor having a chamber with a packed bed comprising a series of surfaces, the co-current flow being substantially non-turbulent substantially plug flow in the reactor and packed bed;
    maintaining an ozone mass transfer coefficient between about 0.01 and about 2 $sec^{-1}$;
    reacting the flow of ozone, hydrogen peroxide, caustic and waste fluid in the tubular reactor for an effective life of ozone thereby producing a treated liquid;
    continuously recovering treated liquid and gas from a to end of the tubular reactor.

4. The method according to claim 3, wherein pressure is between about 2 and about 5 atmospheres absolute.

5. The method according to claim 3, wherein temperature is from ambient to about 70° C.

6. The method according to claim 3, wherein pH is from about 7 to about 11.

7. The method according to claim 3, wherein the series of surfaces comprises raschig rings.

8. The method according to claim 3, wherein waste concentration is less than about 3000 parts per million.

9. The method according to claim 3, wherein hydrogen peroxide concentration is from about 0.5 to about 3% by weight.

10. The method according to claim 3, wherein volumetric ratio of ozone gas to waste fluid is about 2:1.

11. The method according to claim 3, wherein concentration of ozone is from about 6 to about 8% by volume.

12. The method according to claim 3, wherein ozone is diffused through a sintered or ceramic article having a porosity between about 5 to about 20 microns.

13. The method according to claim 3, wherein ozone mass transfer is increased by increasing the gas liquid interfacial area of bubbles traversing a non-turbulent flow through a reaction zone and maintaining increased gas-liquid interfacial area of ozone bubbles traversing the reaction zone.

14. The method according to claim 3, wherein flow of fluid through the reactor having the packed bed without substantial back mixing facilitates an increase in residence time of the ozone.

15. The method for treating waste fluid according to claim 3, further comprising an ozone mass transfer coefficient between about 0.01 and about 2 $sec^{-1}$.

16. The method for treating waste fluid according to claim 15, wherein the ozone mass transfer coefficient being between about 0.05 and about 2 $sec^{-1}$.

17. The method for treating waste fluid according to claim 3, further comprising ozone mass transfer being increased by maximizing the difference in concentrations of ozone across a gas-liquid interface.

18. The method for treating waste fluid according to claim 3, further comprising enhancing the rate of ozone mass transfer into waste fluid comparable to the rate that ozone is being utilized during oxidation.

19. The method for treating waste fluid according to claim 3, wherein ozone is diffused through a sintered or ceramic article having a porosity between about 0.2 to about 100 microns.

20. The method according to claim 3, wherein the co-current flow being substantially laminar.

21. The method according to claim 3, wherein liquid flow rate and resulting liquid reactor residence time being scaled to correspond to the effective life of the ozone in the reactor.

22. A method for treating waste fluid while suppressing stripping of organics and enhancing gas-liquid ozone mass transfer rate comprising:

continuously feeding a co-current flow of waste fluid, ozone, hydrogen peroxide and an effective amount of caustic if needed to adjust the pH without substantial back mixing into a bottom end of a substantially vertical substantially tubular reactor having a chamber with a packed bed comprising a series of surfaces, the co-current flow being substantially non-turbulent substantially plug flow in the reactor and packed bed;

the flow of fluid being under sufficient pressure, temperature, and pH with an ozone mass transfer coefficient between about 0.01 and about 2 sec$^{-1}$ complementing an effective life of the ozone;

reacting the flow of ozone, hydrogen peroxide, effective amount of caustic and waste fluid in the tubular reactor thereby producing an oxidized liquid;

continuously recovering oxidized liquid and gas from a to end of the tubular reactor.

23. The method according to claim 22, wherein the co-current flow being substantially laminar.

24. A method for treating waste fluid while suppressing stripping of organics and enhancing gas-liquid ozone mass transfer rate comprising:

continuously supplying ozone gas, hydrogen peroxide and an effective amount of caustic if needed to adjust the pH with a flow of waste fluid proximate to a bottom end of a substantially vertical substantially tubular reactor having a chamber with a packed bed comprising a series of surfaces;

reacting ozone, hydrogen peroxide, and effective amount of caustic co-currently with a flow of waste fluid inside the tubular reactor without substantial back-mixing thereof, thereby producing an oxidized waste fluid;

maintaining a pH from 7 to about 11 for the fluid being treated and an effective pressure for an ozone mass transfer coefficient between about 0.01 and about 2 sec$^{-1}$ which compliments an effective life of the ozone;

maintaining the effective pressure for the ozone mass transfer coefficient between about 2 and about 5 atmospheres absolute;

maintaining the reaction temperature between ambient to about 70° C.;

flowing the fluids co-currently through the packing providing a plug flow path through the tubular reactor;

continuously withdrawing the oxidized waste fluid from a to end of the tubular reactor; and wherein the concentration of ozone is an effective concentration from about 6% by volume in the ozone gas and the volumetric ratio of ozone gas to waste fluid being about 2:1 with a hydrogen peroxide concentration being from about 0.5% to about 3% by weight of waste fluid.

\* \* \* \* \*